US012729964B2

United States Patent
(12) United States Patent

Hori et al.

(10) Patent No.: US 12,729,964 B2
(45) Date of Patent: Sep. 8, 2026

(54) INFORMATION PROCESSING METHOD, PROGRAM, INFORMATION PROCESSING APPARATUS, INFORMATION PROCESSING SYSTEM, AND MAP DATA GENERATION METHOD

(71) Applicant: WHILL, Inc., Tokyo (JP)

(72) Inventors: Kazunori Hori, Tokyo (JP); Taiga Arai, Tokyo (JP); Yoshiya Kaneko, Tokyo (JP)

(73) Assignee: WHILL, Inc., Tokyo (JP)

( * ) Notice: Subject to any disclaimer, the term of this patent is extended or adjusted under 35 U.S.C. 154(b) by 0 days.

(21) Appl. No.: 19/117,639

(22) PCT Filed: Aug. 31, 2023

(86) PCT No.: PCT/JP2023/032013
§ 371 (c)(1),
(2) Date: Apr. 2, 2025

(87) PCT Pub. No.: WO2024/080036
PCT Pub. Date: Apr. 18, 2024

(65) Prior Publication Data

US 2026/0009648 A1 Jan. 8, 2026

(30) Foreign Application Priority Data

Oct. 11, 2022 (JP) ................................ 2022-163478

(51) Int. Cl.
*G01C 21/20* (2006.01)
*B60W 30/09* (2012.01)
*B60W 60/00* (2020.01)

(52) U.S. Cl.
CPC .......... *G01C 21/206* (2013.01); *B60W 30/09* (2013.01); *B60W 60/0016* (2020.02); *B60W 2556/45* (2020.02)

(58) Field of Classification Search
CPC . G01C 21/206; B60W 30/09; B60W 60/0016; B60W 2556/45
(Continued)

(56) References Cited

U.S. PATENT DOCUMENTS

2016/0375901 A1* 12/2016 Di Cairano .......... B60W 30/09 701/26
2020/0236501 A1* 7/2020 Suzuki ................. H04W 4/029
2024/0151553 A1* 5/2024 Nishimura ......... G01C 21/3896

FOREIGN PATENT DOCUMENTS

EP 4151952 A1 * 3/2023 ......... G01C 21/3438
JP H04302400 A 10/1992
(Continued)

OTHER PUBLICATIONS

Apr. 23, 2024, Notification of Reasons for Refusal issued by the Japan Patent Office in the corresponding Japanese Patent Application No. 2023-579855.
(Continued)

*Primary Examiner* — Hitesh Patel
*Assistant Examiner* — John D Holman
(74) *Attorney, Agent, or Firm* — KENJA IP LAW PC

(57) ABSTRACT

An information processing method and the like realize autonomous travel of a mobile body (30) that supports the movement of people who have difficulty walking long distances on their own. The information processing method is for a computer to execute processing including acquiring a current position and a destination from a mobile body (30) that moves with a person on board, acquiring a first route (61) from the current position to the destination, the first route (61) being generated based on map data (51) that includes a plurality of nodes and links each associating a starting node, an ending node, and a travel condition, and transmitting the first route (61) to the mobile body (30).

7 Claims, 36 Drawing Sheets

(58) Field of Classification Search
USPC ........................................................ 701/26
See application file for complete search history.

(56) References Cited

FOREIGN PATENT DOCUMENTS

| | | | |
|---|---|---|---|
| JP | H11211491 | A | 8/1999 |
| JP | 2001084491 | A | 3/2001 |
| JP | 2006017647 | A | 1/2006 |
| JP | 2012164132 | A | 8/2012 |
| JP | 2017053683 | A | 3/2017 |
| JP | 2019017304 | A | 2/2019 |
| JP | 2019082431 | A | 5/2019 |
| JP | 2020004017 | A | 1/2020 |
| WO | 2017010126 | A1 | 1/2017 |
| WO | 2021229881 | A1 | 11/2021 |
| WO | 2022180937 | A1 | 9/2022 |

OTHER PUBLICATIONS

Aug. 20, 2024, Decision to Grant a Patent issued by the Japan Patent Office in the corresponding Japanese Patent Application No. 2023-579855.

Oct. 31, 2023, International Search Report issued in the International Patent Application No. PCT/JP2023/032013.

* cited by examiner

| Node ID | Coordinates | |
|---|---|---|
| | x | y |
| P | *** | *** |
| Q | *** | *** |
| R1 | *** | *** |
| R2 | *** | *** |
| ⋮ | ⋮ | ⋮ |

| Link ID | Position | | Transit pass | | | | Travel conditions | |
|---|---|---|---|---|---|---|---|---|
| | Start point | End point | Transit pass ID | Type | Request | Confirmation | Offset | ······ |
| L001 | P | Q | Not required | — | — | — | 0.8 | ······ |
| L002 | Q | P | Not required | — | — | — | 0.8 | ······ |
| L003 | Q | R1 | Not required | — | — | — | 0.8 | ······ |
| L004 | R1 | Q | Not required | — | — | — | 0.8 | ······ |
| L005 | R1 | R0 | PASS-C1 | Intersection | 2 | 1 | 0.8 | ······ |
| L006 | R0 | R1 | PASS-C1 | Intersection | — | — | 0.8 | ······ |
| L007 | R0 | R4 | PASS-C1 | Intersection | — | — | 0.8 | ······ |
| L008 | R4 | R0 | PASS-C1 | Intersection | 2 | 1 | 0.8 | ······ |
| L009 | R4 | S | PASS-N1 | Bottleneck | 2 | 1 | 0 | ······ |
| L010 | S | R4 | PASS-N1 | Bottleneck | 2 | 1 | 0 | ······ |
| L011 | S | T | Not required | — | — | — | 0.8 | ······ |
| L012 | T | S | Not required | — | — | — | 0.8 | ······ |
| L013 | R0 | R3 | PASS-C1 | Intersection | — | — | 0.8 | ······ |
| L014 | R3 | R0 | PASS-C1 | Intersection | 2 | 1 | 0.8 | ······ |
| L015 | R0 | R2 | PASS-C1 | Intersection | — | — | 0.8 | ······ |
| L016 | R2 | R0 | PASS-C1 | Intersection | 2 | 1 | 0.8 | ······ |
| ⋮ | ⋮ | ⋮ | ⋮ | | ⋮ | ⋮ | ⋮ | ······ |

| Mobile body ID | Point of departure | Destination | Route | Current position | Transit pass |
|---|---|---|---|---|---|
| C001 | **** | **** | PQRSTU | **** | PASS-C1、PASS-N1 |
| C002 | **** | **** | ABCDE | **** | — |
| C003 | — | — | — | **** | — |
| ⋮ | ⋮ | ⋮ | ⋮ | ⋮ | ⋮ |

| Node ID | Coordinates | | |
| --- | --- | --- | --- |
| | Floor | x | y |
| Yu | u | *** | *** |
| Zu1 | u | *** | *** |
| Zu2 | u | *** | *** |
| Zu3 | u | *** | *** |
| ⋮ | ⋮ | ⋮ | ⋮ |
| Yd | d | *** | *** |
| Zd1 | d | *** | *** |
| Zd2 | d | *** | *** |
| Zd3 | d | *** | *** |
| ⋮ | ⋮ | ⋮ | ⋮ |

| Link ID | Position | | Transit pass | | | | Travel condition | | |
|---|---|---|---|---|---|---|---|---|---|
| | Start point | End point | Transit pass ID | Type | Request | Confirmation | Offset | Orientation | ...... |
| L101 | Yu | Zu1 | Not required | — | — | — | 80 | Forward | ...... |
| L102 | Zu1 | Yu | Not required | — | — | — | 80 | Forward | ...... |
| L103 | Zu1 | Zu2 | EVu-1 | Elevator | 200 | 100 | 0 | Forward→ turn around | ...... |
| L104 | Zu2 | Zu3 | EVu-2 | Elevator | — | — | 0 | Backward | ...... |
| L105 | Zu3 | Zu2 | EVu-3 | Elevator | — | — | 0 | Forward | ...... |
| L106 | Zu2 | Zu1 | EVu-4 | Elevator | — | — | 0 | Forward | ...... |
| L107 | Zu3 | Zd3 | EVu-5 | Elevator | — | — | — | — | ...... |
| ⋮ | ⋮ | ⋮ | ⋮ | ⋮ | ⋮ | ⋮ | ⋮ | ⋮ | ...... |
| L201 | Yd | Zd1 | Not required | — | — | — | 80 | Forward | ...... |
| L202 | Zd1 | Yd | Not required | — | — | — | 80 | Forward | ...... |
| L203 | Zd1 | Zd2 | EVd-1 | Elevator | 200 | 100 | 0 | Forward→ turn around | ...... |
| L204 | Zd2 | Zd3 | EVd-2 | Elevator | — | — | 0 | Backward | ...... |
| L205 | Zd3 | Zd2 | EVd-3 | Elevator | — | — | 0 | Forward | ...... |
| L206 | Zd2 | Zd1 | EVd-4 | Elevator | — | — | 0 | Forward | ...... |
| L207 | Zd3 | Zu3 | EVd-5 | Elevator | — | — | — | — | ...... |
| ⋮ | ⋮ | ⋮ | ⋮ | ⋮ | ⋮ | ⋮ | ⋮ | ⋮ | ...... |

| Link ID | Position | | Transit pass | | | | Travel condition | | Avoidance condition | | |
|---|---|---|---|---|---|---|---|---|---|---|---|
| | Start point | End point | Transit pass ID | Type | Request | Confirmation | Offset | ...... | Permission | Left side width | Right side width |
| L001 | P | Q | Not required | — | — | — | 0.8 | ...... | Yes | 0.6 | 1.2 |
| L002 | Q | P | Not required | — | — | — | 0.8 | ...... | Yes | 1.2 | 0.6 |
| L003 | Q | R1 | Not required | — | — | — | 0.8 | ...... | Yes | 0.6 | 1.2 |
| L004 | R1 | Q | Not required | — | — | — | 0.8 | ...... | Yes | 1.2 | 0.6 |
| L005 | R1 | R0 | PASS-C1 | Intersection | 2 | 1 | 0.8 | ...... | No | — | — |
| L006 | R0 | R1 | PASS-C1 | Intersection | — | — | 0.8 | ...... | No | — | — |
| L007 | R0 | R4 | PASS-C1 | Intersection | — | — | 0.8 | ...... | No | — | — |
| L008 | R4 | R0 | PASS-C1 | Intersection | 2 | 1 | 0.8 | ...... | No | — | — |
| L009 | R4 | S | PASS-N1 | Bottleneck | 2 | 1 | 0 | ...... | Yes | 0.3 | 0.3 |
| L010 | S | R4 | PASS-N1 | Bottleneck | 2 | 1 | 0 | ...... | Yes | 0.3 | 0.3 |
| L011 | S | T | Not required | — | — | — | 0.8 | ...... | Yes | 1.5 | 2 |
| L012 | T | S | Not required | — | — | — | 0.8 | ...... | Yes | 2 | 1.5 |
| L013 | R0 | R3 | PASS-C1 | Intersection | — | — | 0.8 | ...... | No | — | — |
| L014 | R3 | R0 | PASS-C1 | Intersection | 2 | 1 | 0.8 | ...... | No | — | — |
| L015 | R0 | R2 | PASS-C1 | Intersection | — | — | 0.8 | ...... | No | — | — |
| L016 | R2 | R0 | PASS-C1 | Intersection | 2 | 1 | 0.8 | ...... | No | — | — |
| ...... | ...... | ...... | ...... | | ...... | ...... | ...... | ...... | ...... | ...... | ...... |

67
671
672
P2
63
713
71
712
P1
711
62
DL
DR

INFORMATION PROCESSING METHOD, PROGRAM, INFORMATION PROCESSING APPARATUS, INFORMATION PROCESSING SYSTEM, AND MAP DATA GENERATION METHOD

TECHNICAL FIELD

The present disclosure relates to an information processing method, a program, an information processing apparatus, an information processing system, and a map data generation method.

BACKGROUND

A map data structure, for autonomous driving, that represents a road network by a combination of links and nodes has been proposed. For example, an intersection is represented by a combination of incoming links, outgoing links, and nodes (Patent Literature (PTL) 1).

CITATION LIST

Patent Literature

PTL 1: JP 2019-82431 A

SUMMARY

Technical Problem

General motor vehicles, such as passenger cars, buses, and trucks, travel on roadways. The links in PTL 1 correspond to the respective lanes constituting a roadway. Each autonomously driven vehicle travels on the indicated link, using the center line and lane boundaries drawn on the roadway as guides to define a travel line.

In airports, shopping malls, and other large places, electric wheelchairs and other single-person vehicles are used to support the movement of the elderly and others who have difficulty walking long distances on their own. Having these mobile bodies drive autonomously can prevent collisions and other accidents caused by incorrect operation by inexperienced users.

However, since the majority of users at such locations are pedestrians, it is difficult to provide a dedicated roadway for mobile bodies.

One aspect aims to provide an information processing method and the like that realize autonomous travel of a mobile body that supports the movement of people who have difficulty walking long distances on their own.

Solution to Problem

An information processing method is for a computer to execute processing including acquiring a current position and a destination from a mobile body that moves with a person on board, acquiring a first route from the current position to the destination, the first route being generated based on map data that includes a plurality of nodes, and links each associating a starting node, an ending node, and a travel condition, and transmitting the first route to the mobile body.

Advantageous Effect

One aspect can provide an information processing method and the like that realize autonomous travel of a mobile body that supports the movement of people who have difficulty walking long distances on their own.

BRIEF DESCRIPTION OF THE DRAWINGS

In the accompanying drawings:

FIG. 4 is a diagram illustrating the record layout of a node DB;

FIG. 5 is a diagram illustrating the record layout of a link DB;

FIG. 6 is a diagram illustrating the record layout of a mobile body DB;

FIG. 11 is a diagram illustrating transit passes;

FIG. 12 is a diagram illustrating transit passes;

FIG. 19 is a diagram illustrating the record layout of a node DB in the second embodiment;

FIG. 20 is a diagram illustrating the record layout of a link DB in the second embodiment;

FIG. 30 is a diagram illustrating the record layout of a link DB in a fourth embodiment;

DETAILED DESCRIPTION

First Embodiment

Figure 1:
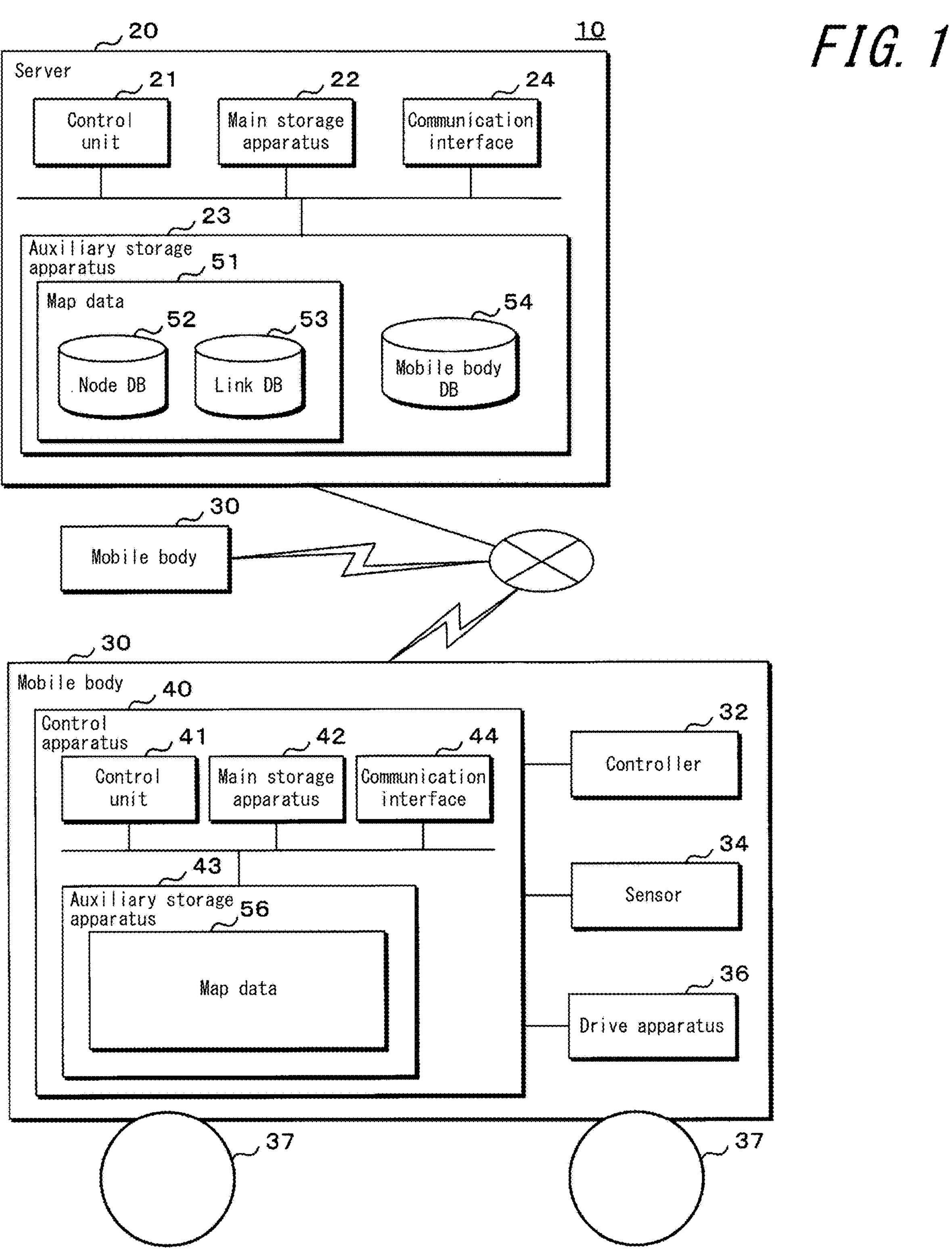
FIG. 1 is a diagram illustrating the configuration of an information processing system.

FIG. 1 is a diagram illustrating the configuration of an information processing system 10. The information processing system 10 includes a server 20 and a plurality of mobile bodies 30. The mobile bodies 30 are electric wheelchairs, such as electric carts or senior cars, that move to a destination with a person on board.

The mobile body 30 of the present embodiment is, for example, an electric wheelchair and is used to provide mobility assistance to elderly persons and others who have difficulty walking long distances on their own in large areas with many pedestrians, such as airports and shopping malls. Users of the mobile body 30 used for such an application are unfamiliar with the operation of the mobile body 30. Having the mobile body 30 drive autonomously to the destination desired by the user can prevent collisions and other accidents caused by incorrect operation by inexperienced users.

The mobile body 30 includes a control apparatus 40, a controller 32, a sensor 34, a drive apparatus 36 and wheels such as tires 37. The tires 37 are preferably omni-directional wheels. The control apparatus 40 includes a control unit 41, a main storage apparatus 42, an auxiliary storage apparatus 43, a communication interface 44, and a bus. The control apparatus 40 is an example of a client in the information processing system 10.

The control unit 41 is an arithmetic and control unit that executes the program of the present embodiment. One or more Central Processing Units (CPU), Graphics Processing Units (GPU), Tensor Processing Units (TPU), multi-core CPUs, or the like are used in the control unit 41. The control unit 41 is connected via the bus to the hardware components that make up the control apparatus 40.

The main storage apparatus 42 is a storage apparatus such as Static Random Access Memory (SRAM), Dynamic Random Access Memory (DRAM), or flash memory. The main storage apparatus 42 temporarily stores information necessary during processing executed by the control unit 41 and programs being executed by the control unit 41.

The auxiliary storage apparatus 43 is a storage apparatus such as SRAM, flash memory, a hard disk, or magnetic tape. The auxiliary storage apparatus 43 stores map data 56, the programs to be executed by the control unit 41, and various data necessary to execute the programs. The map data 56 may be stored in an external mass storage apparatus connected to the control apparatus 40. The communication interface 44 is an interface for communication between the control apparatus 40 and a network.

The control apparatus 40 of the present embodiment is a general-purpose personal computer, tablet, smartphone, or other information processing apparatus. The control apparatus 40 may be dedicated hardware for the mobile body 30. The control apparatus 40 may be a plurality of personal computers or the like that perform distributed processing.

The controller 32 is a remote controller provided with a user interface apparatus such as a touch panel, microphone, and speaker, for example. The controller 32 may be an information device such as a general-purpose smartphone or tablet. The controller 32 may be dedicated hardware provided with a joystick or the like. The controller 32 may be a game controller for a home gaming console. The controller 32 is connected to the control apparatus 40 in a wired or wireless manner and functions as an input/output apparatus for the control apparatus 40.

The sensor 34 is any of various sensors, such as infrared sensors, ultrasonic sensors, Light Detection and Ranging (LiDAR) sensors, Time Of Flight (ToF) sensors, image sensors, and Global Positioning System (GPS) sensors. The sensor 34 detects obstacles 71 (see FIG. 31), such as pedestrians around the mobile body 30, other mobile bodies 30, walls, steps, and luggage placed on the floor that prevent the mobile body 30 from traveling. The sensor 34 may detect markers on the floor or wall for guidance or for current position calibration. The sensor 34 may receive a beacon used to determine the current position.

The mobile body 30 includes a plurality of sensors 34 and automatically stops or bypasses an obstacle 71 before collision in the case of detecting the obstacle 71. The control unit 41 determines the current position of the mobile body 30 when necessary based on a GPS sensor, markers, or beacons, or the like and transmits the current position to the server 20. The control unit 41 may estimate the current position of the mobile body 30 when necessary, based on the distance traveled and direction, and transmit the current position to the server 20.

The drive apparatus 36 controls the tires 37 based on instructions from the control unit 41 to cause the mobile body 30 to travel and stop. Although omitted from the drawings, the drive apparatus 36 also includes a CPU or other control unit. The control unit 41 may also serve as the control unit of the drive apparatus 36.

The server 20 includes a control unit 21, a main storage apparatus 22, an auxiliary storage apparatus 23, a communication interface 24, and a bus. The control unit 21 is an arithmetic and control unit that executes the program of the present embodiment. One or more CPUs, GPUs, TPUs, multi-core CPUs, or the like are used in the control unit 21. The control unit 21 is connected via the bus to the hardware components that make up the server 20.

The main storage apparatus 22 is a storage apparatus such as SRAM, DRAM, or flash memory. The main storage apparatus 22 temporarily stores information necessary during processing performed by the control unit 21 and programs being executed by the control unit 21.

The auxiliary storage apparatus 23 is a storage apparatus such as SRAM, flash memory, a hard disk, or magnetic tape. The auxiliary storage apparatus 23 stores map data 51, a mobile database (DB) 54, programs to be executed by the control unit 21, and various data necessary to execute the programs. The map data 51 includes a node DB 52 and a link DB 53. The map data 51 and the mobile body DB 54 may be stored in an external mass storage apparatus connected to the server 20. The communication interface 24 is an interface for communication between the server 20 and a network.

The server 20 in the present embodiment is an information device such as a general-purpose server computer, personal computer, tablet or smartphone. The server 20 may be a mainframe, a virtual machine running on a mainframe, a cloud computing system, a quantum computer, a plurality of personal computers performing distributed processing, or the like.

In the following description, the case in which the control unit 21 and control unit 41 perform mainly software processing will be used as an example. Each of the processes described using the flowchart may be implemented with dedicated hardware.

Figure 2:
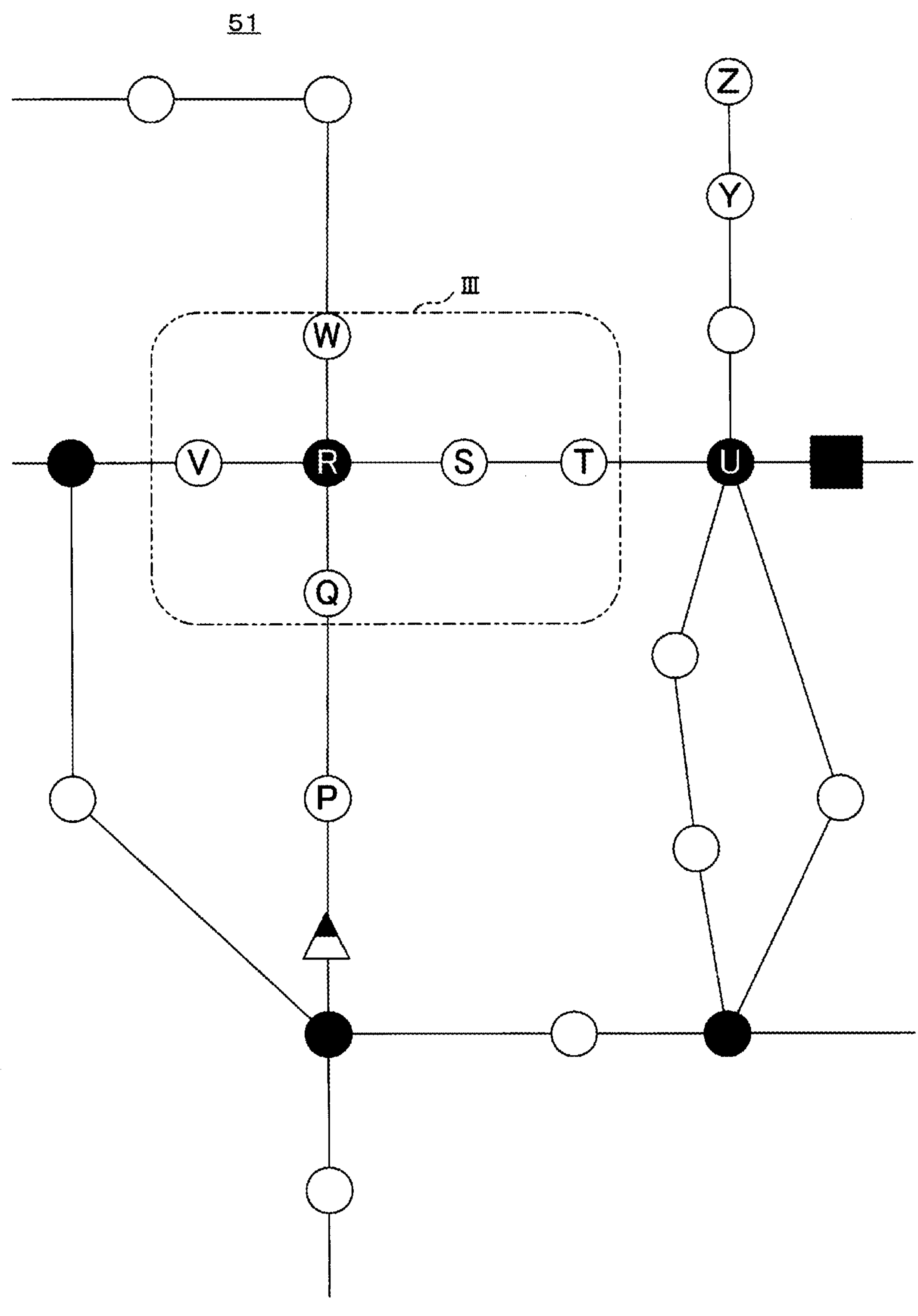
FIG. 2 is a diagram illustrating map data.

FIG. 2 is a diagram illustrating the map data 51. The map data 51 is formed by a plurality of nodes and links connecting two nodes. In FIG. 2, white and black circles indicate nodes, and lines connecting nodes indicate links. White circles indicate normal nodes connected to one or two links. Black circles indicate intersection nodes connected to three or more links.

In the following explanation, the letter indicated inside the node is used when distinguishing individual nodes. For example, the node with the letter "Z" illustrated in the upper right corner of FIG. 2 is described as "Z" or "Node Z". These letters are examples of node identifiers (IDs) that are uniquely assigned to each node. Links may be straight or curved. In the following, the case of the link being a straight line connecting two nodes is described as an example.

In FIG. 2, the triangle indicates the position of the mobile body 30. The blackened corner inside the triangle indicates the direction of travel of the mobile body 30. In the example described below, a user boards the mobile body 30 at the position of the triangle and operates the controller 32 to designate the destination indicated by the square.

The control unit 21 generates a route from the current position to the destination. In the case of a plurality of routes connecting the current position and the destination, the control unit 21 selects the route to be used based on a predetermined rule, such as to minimize the travel distance or the travel time. Since travel routes based on a map composed of nodes and links have conventionally been generated, a detailed explanation is omitted. In the following description, the mobile body 30 travels along a route that leads to the destination by passing through the nodes P, Q, R, S, T, and U in order.

Figure 3:
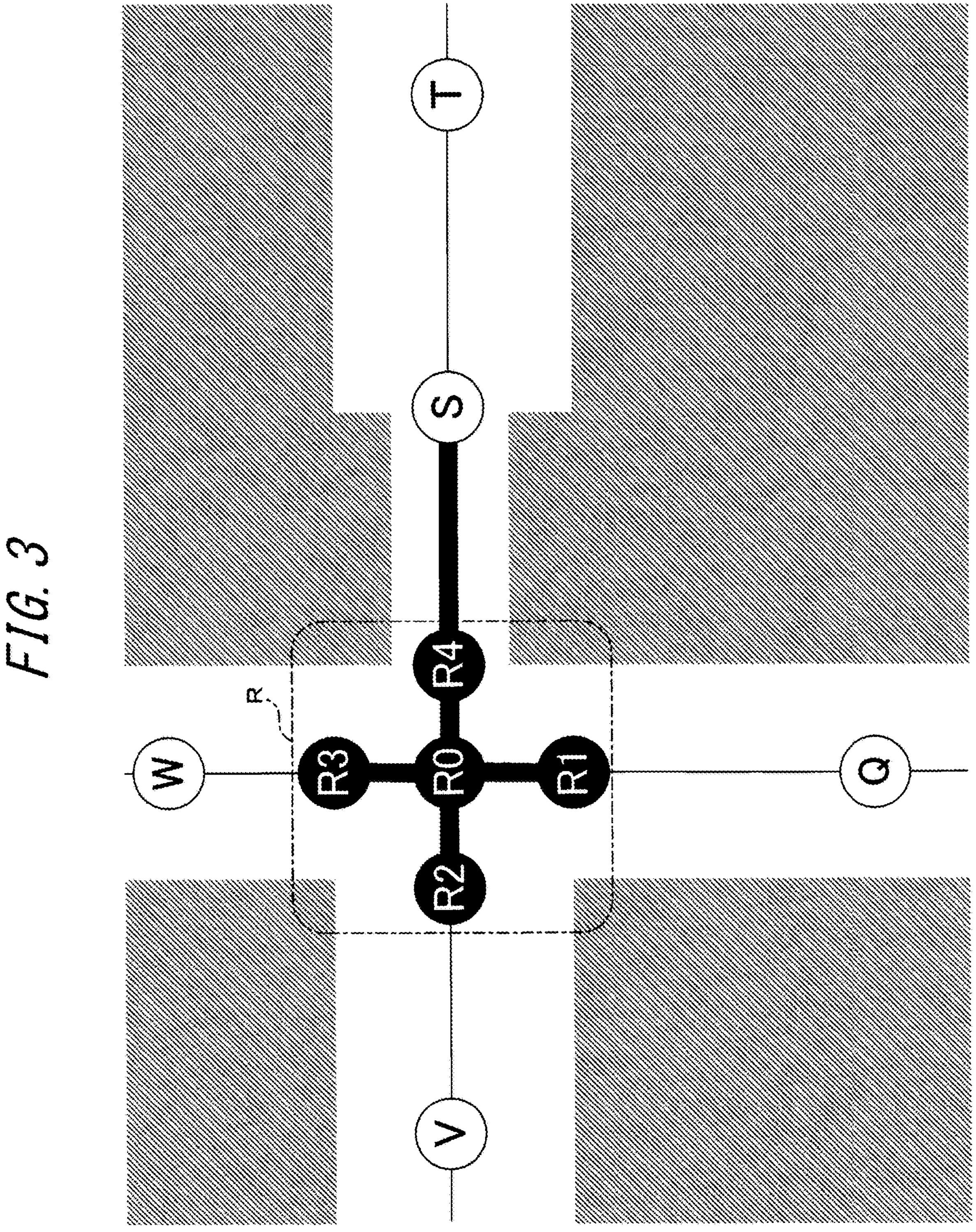
FIG. 3 is an enlarged view of part III in FIG. 2.

FIG. 3 is an enlarged view of part III in FIG. 2. FIG. 3 is used to illustrate intersection nodes in detail. Node R, abbreviated by a single black circle in FIG. 2, consists of five nodes from node R0 to node R4, as illustrated in FIG. 3. The mobile body 30 enters the intersection from node R1 and exits from node R4.

In FIG. 3, prohibited areas into which the mobile body 30 cannot enter are indicated by hatching. The prohibited area is an area where the entry of the mobile body 30 is physically prevented by an obstacle 71, such as a wall or fence, for example. The prohibited area may be a virtually defined area for coexistence with pedestrians and for traffic control of the mobile body 30.

The link connecting node R4 and node S is a bottleneck link, which has a narrower width for passage of the mobile body 30 as compared to other links. For example, mobile bodies 30 can pass each other in the link connecting node S and node T, whereas mobile bodies 30 cannot pass each other in the bottleneck link connecting node R4 and node S.

In FIG. 3, the intersection links connecting the nodes that make up the intersection nodes, as well as the aforementioned bottleneck links, are indicated by bold lines. These links indicated by the bold lines can only be traveled by a mobile body 30 that has a transit pass, as described below. Upon approaching a link indicated by a bold line, the mobile body 30 transmits an issuance request for a transit pass to the server 20. The server 20 issues the transit pass in a case in which the mobile body 30 that requested issuance of the transit pass can travel on that link without interfering with other mobile bodies 30.

The mobile body 30 enters the link after receiving the transit pass. In a case in which no transit pass is issued, the mobile body 30 stops before the planned travel link and waits until a transit pass is issued. Collisions and the like between mobile bodies 30 at intersections and bottleneck links are thus prevented. Details of the processing related to the transit pass are described below.

The area recorded in the map data 56 for each mobile body 30 is identical to the area recorded in the map data 51. In a case in which the travel range of the mobile body 30 is limited, the area recorded in the map data 56 may be a portion of the area recorded in the map data 51. After the destination and travel route are determined, the necessary portion may be extracted from the map data 51, transmitted from the server 20 to the mobile body 30, and recorded.

In the following, the case in which the same area is recorded in the map data 56 and the map data 51 is described as an example.

FIG. 4 is a diagram illustrating the record layout of the node DB 52. The node DB 52 is a database that records the coordinates of each node in association with each other. The node DB 52 has a node ID field and a coordinate field. The coordinate field has an x field and a y field.

The node ID uniquely assigned to each node is recorded in the node ID field. In FIG. 4, the letter written in the circle indicating each node in FIG. 2 is listed as the node ID. The x-coordinate of the node is recorded in the x field. The y-coordinate of the node is recorded in the y field. The node DB 52 has one record for one node.

FIG. 5 is a diagram illustrating the record layout of the link DB 53. The link DB 53 is a database that records information about each link in association with each other. The link DB 53 has a link ID field, a position field, a transit pass field, and a travel condition field.

The position field has a start point field and an end point field. The transit pass field has a transit pass ID field, a type field, a request field, and a confirmation field. The travel condition field has an offset field. The travel condition field may, for example, include an upper speed limit, a lower speed limit, a vehicle body travel direction (forward travel or backward travel), and various other fields that record the travel conditions for the respective link.

The link ID uniquely assigned to each link is recorded in the link ID field. The starting node of the link is recorded in the start point field. The ending node of the link is recorded in the end point field. For example, the starting node and the ending node are switched between the link "L001" and the link "L002".

The transit pass ID that identifies the transit pass for traveling on the link is recorded in the transit pass ID field. "Not required" in the transit pass ID field indicates that a transit pass is not required to travel on the link. For links for which no transit pass is required, "-" is recorded in the type field, the request field, and the confirmation field, which record information about the transit pass.

In the example illustrated in FIG. 5, the certificate ID required for the mobile body 30 traveling on the intersection link connecting the intersection nodes from node R0 to node R4 is "Pass-C1". The certificate ID required for the mobile body 30 traveling on the bottleneck link connecting node R4 and node S is "Pass-N1".

The type of the transit pass is recorded in the type field. The "intersection" and "bottleneck" refer to the intersection node and bottleneck link, respectively, described with reference to FIG. 3. For links entering intersections and for bottleneck links, the request distance for requesting a transit pass and the confirmation distance for confirming a transit pass are recorded in the request field and confirmation field, respectively. A "-" in the request field and confirmation field indicates that the request distance and confirmation distance are not defined. The request distance and confirmation distance are described below.

The offset for a mobile body 30 traveling on the link is recorded in the offset field. An offset to the left is indicated by a positive number (+) and an offset to the right is indicated by a negative number (−) in the present embodiment. The case of traveling on the left side is described as an example. The mobile body 30 traveling on link "L001" travels on a straight line 0.8 meters to the left of the straight line from node P to node Q. The mobile body 30 traveling on link "L002" travels on a straight line 0.8 meters to the left of the straight line from node Q to node P. In a case in which the offset is greater than half the width of the mobile body 30, mobile bodies 30 can pass each other between node P and node Q.

The offset for the bottleneck links "L009" and "L010" is 0, and the mobile body 30 travels on a straight line connecting node R4 and node S. The offset for the bottleneck links is not limited to 0. The offset may, in some cases, be set at the bottleneck link to a degree that does not enable the mobile bodies 30 to pass each other safely. The link DB 53 has one record for one link. The configuration of the link DB 53, along with the offset, request distance, and confirmation distance, illustrated in FIG. 5 are all examples.

FIG. 6 is a diagram illustrating the record layout of the mobile body DB 54. The mobile body DB 54 is a database that records information related to the mobile body 30. The mobile body DB 54 has a mobile body ID field, a point of departure field, a destination field, a route field, a current position field, and a transit pass field.

The mobile body ID uniquely assigned to the mobile body 30 is recorded in the mobile body ID field. The travel starting position of the mobile body 30 is recorded in the start point field. The destination of the mobile body 30 is recorded in the end point field. The coordinates of the respective positions, for example, are recorded in the start point field and end point field. In a case in which the point of departure and the destination of the mobile body 30 are the position of a node, the node ID may be recorded in the start point field and the end point field.

The travel route of the mobile body 30 is recorded in the route field in the form of a node sequence that lists the node IDs of the nodes that the mobile body 30 passes through in order. For example, "PQRSTU" recorded in the route field of the mobile body 30 "C001" means that mobile body 30 moves to its destination by traveling on a route that passes through nodes P, Q, R, S, T, and U in order.

The coordinates indicating the current position of the mobile body 30 are recorded in the current position field. As described above, the control unit 41 determines the current position of the mobile body 30 when necessary and transmits the current position to the server 20. The control unit 21 receives the current position of each mobile body 30 and updates the current position field of the corresponding record.

The transit pass IDs of the transit passes that have been issued for each mobile body 30 are recorded in the transit pass field. A "-" in the transit pass field indicates that no transit pass has been issued. For a mobile body 30 on standby, a "-" is recorded in the fields other than the current position field. The mobile body DB 54 has one record for one mobile body 30.

Figure 7:
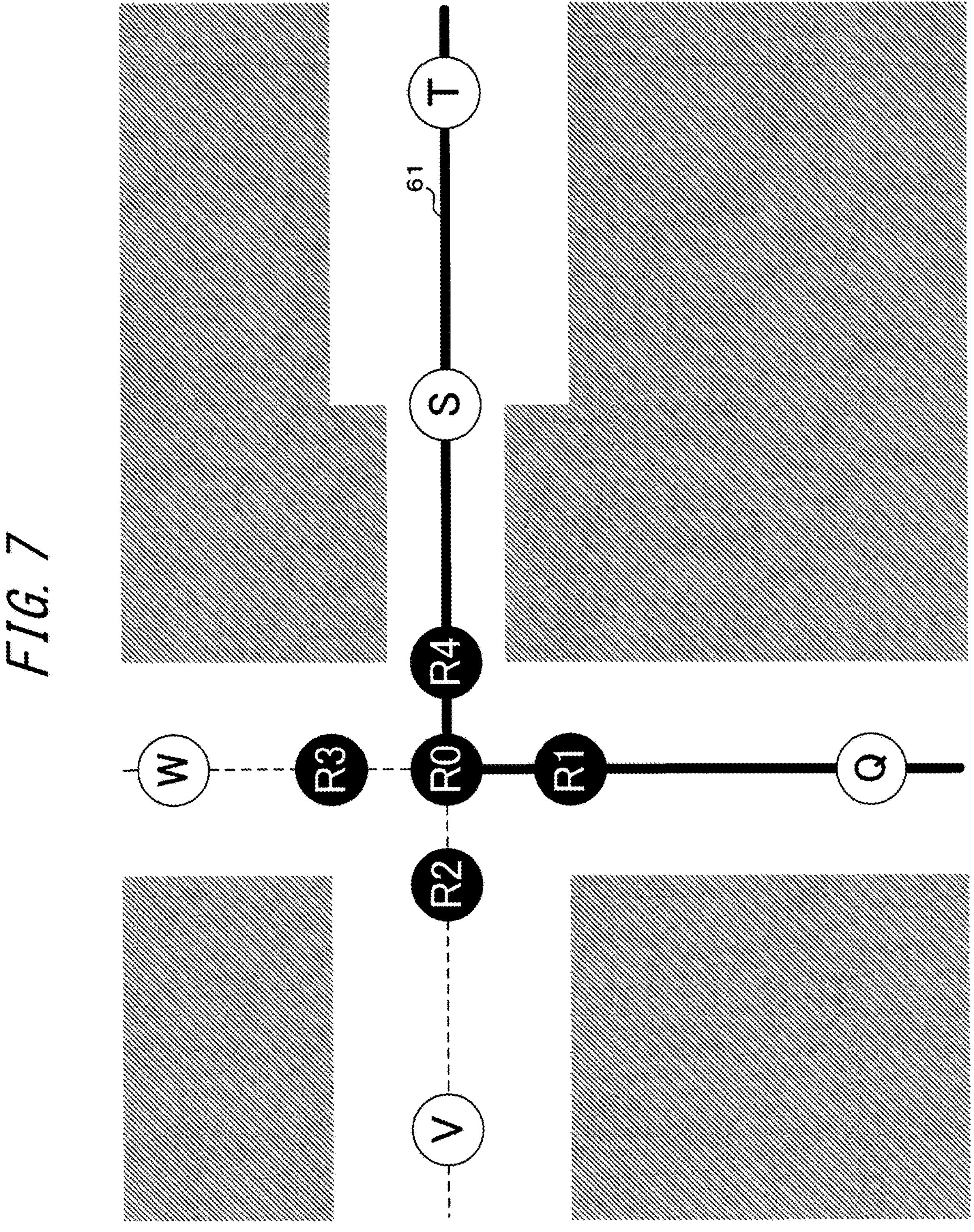
FIG. 7 is a diagram illustrating a first route.

FIG. 7 is a diagram illustrating a first route 61. The control unit 21 generates the first route 61 based on the current position and destination acquired from the mobile body 30. The first route 61 is a route configured by nodes and links. In FIG. 7, the first route 61 is indicated by a bold line.

The control unit 21 records the generated first route 61 in the route field of the mobile body DB 54 in the form of a node sequence with the node IDs of the nodes that are traversed. The control unit 21 transmits information about the first route 61 to the mobile body 30. The information about the first route 61 includes the node sequence, the coordinates of each node, and the travel condition of each link connecting the nodes. The travel condition includes the offset.

Figure 8:
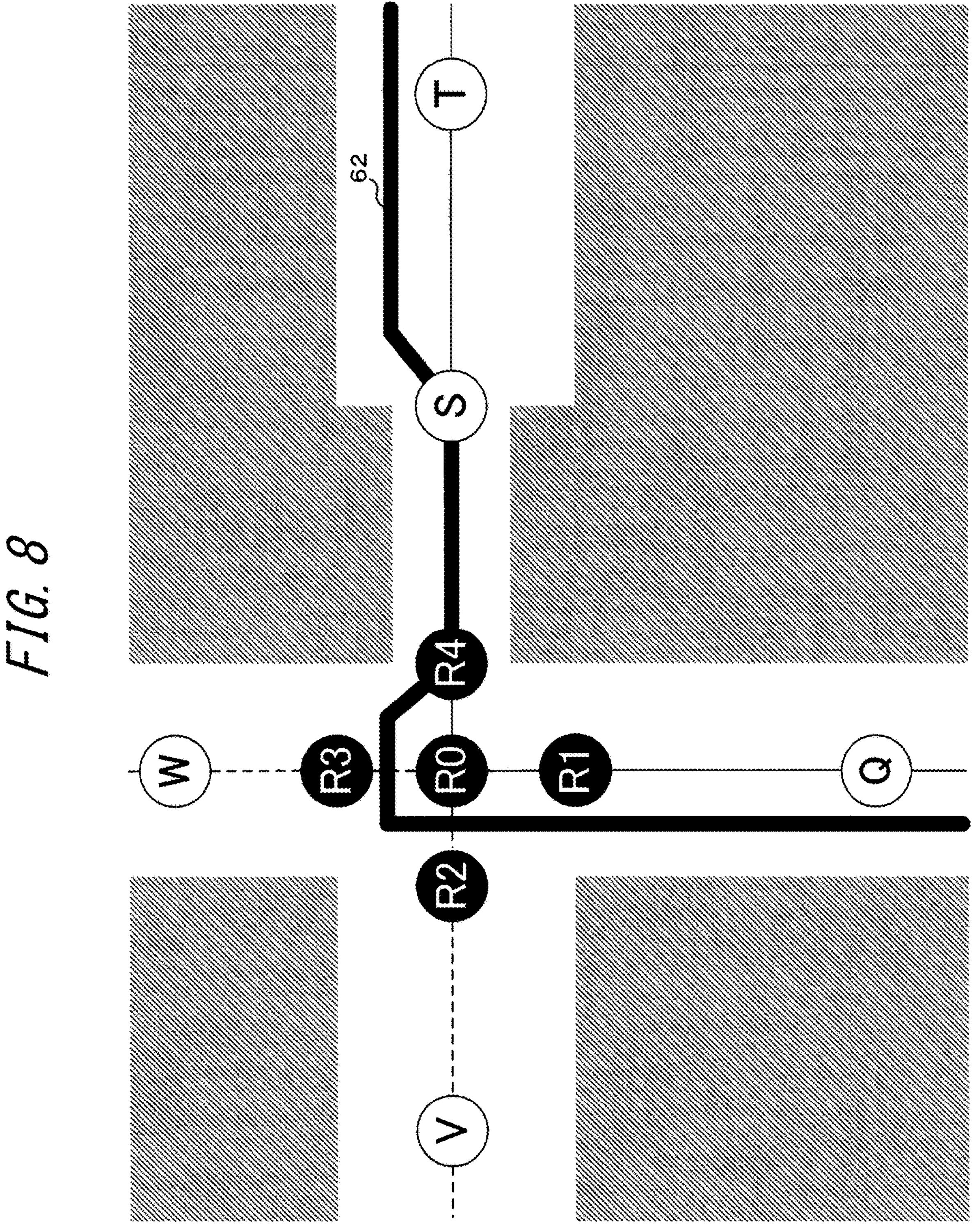
FIG. 8 is a diagram illustrating a second route.

FIG. 8 is a diagram illustrating a second route 62. The second route 62 is the route along which the control unit 41 causes the mobile body 30 to travel. In FIG. 8, the second route 62 is indicated by a bold line. The control unit 41 receives information about the first route 61 from the server 20. The control unit 41 translates each link by the offset to generate the second route 62.

The following is a more specific explanation following FIG. 8 and FIG. 5. The link from node Q to node R1, the link from node R1 to node R0, and the link from node R0 to node R4 all have an offset of 0.8. The second route 62 is therefore offset to the left by 0.8 meters relative to the link. The offset for the bottleneck link from node R4 to node S is 0. The second route 62 is therefore the same route as the link. The offset of the link from node S to node T is 0.8. The second route 62 is therefore offset to the left by 0.8 meters relative to the link.

At locations where the offset changes, the control unit 41 generates the second route 62 so that it forms a 45-degree angle, for example, relative to the first route 61. The control unit 41 may generate the second route 62 so that it forms a gentle curve immediately before and after the bottleneck link.

Similarly, the control unit 41 may generate the second route 62 so that it traces an arc at the upper left portion of node R0 in FIG. 8. By the second route 62 being generated to avoid abrupt direction changes and follow a gentle curve, it is possible to realize a mobile body 30 that is comfortable to ride and that the user can board with peace of mind.

In the following description, the portion of each link that is offset may be described as an offset link. The second route 62 is formed by a plurality of offset links.

FIGS. 9 through 12 are diagrams illustrating transit passes. As explained with reference to FIG. 3, each link from node R1 to node S via node R0 and node R4 can only be traveled by a mobile body 30 holding a transit pass. As explained with reference to FIG. 5, the request distance and confirmation distance are recorded for links entering an intersection and for bottleneck links.

Figure 9:
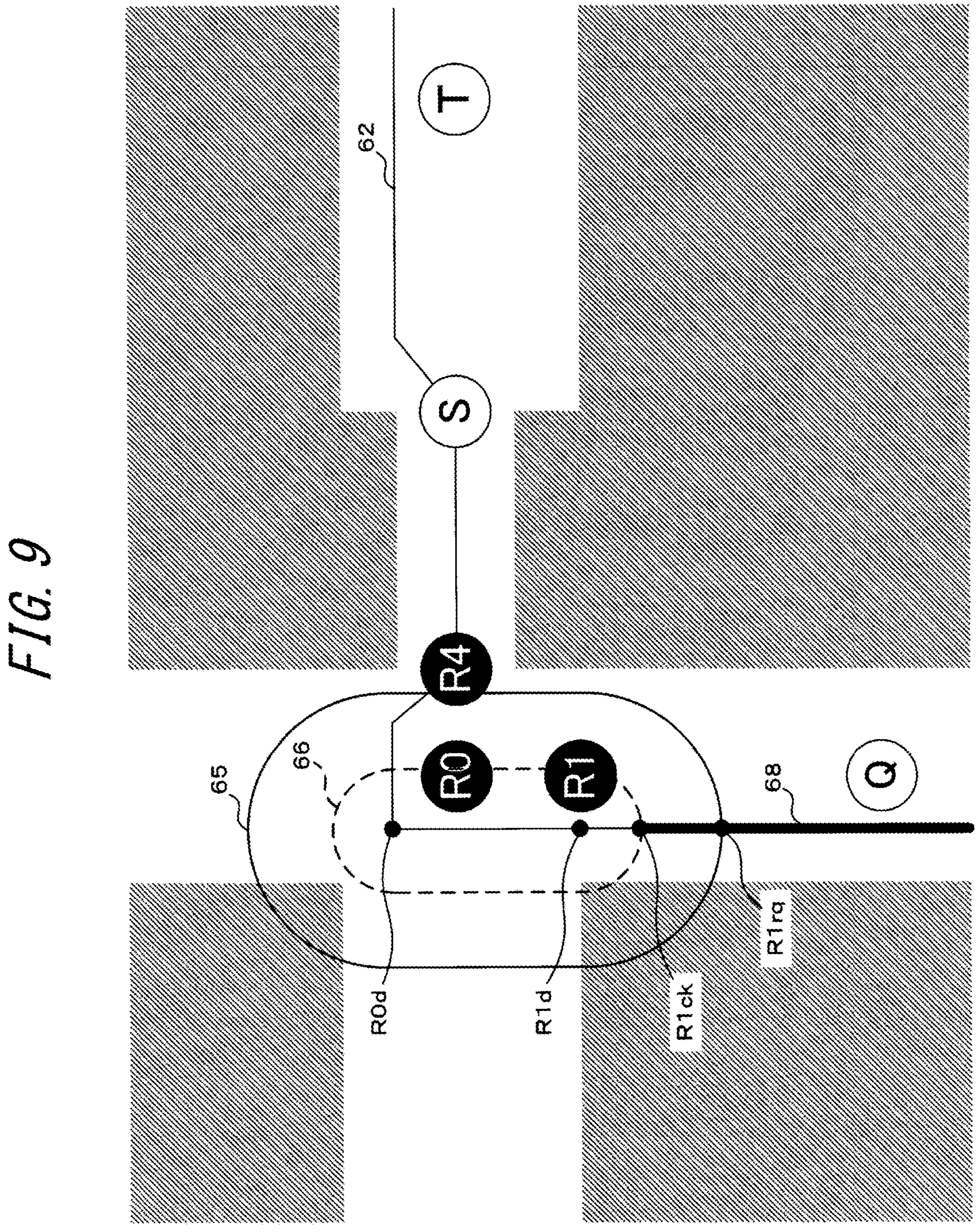
FIG. 9 is a diagram illustrating transit passes.

In FIG. 9, the line connecting points R1*d* and R0*d* is the offset link of the link from node R1 to node R0. A transit pass request line 65, illustrated as a solid line, is a curve that surrounds the offset link at the request distance. A transit pass confirmation line 66, illustrated as a dashed line, is a curve that surrounds the offset link at the confirmation distance. The request distance is longer than the confirmation distance, and the transit pass request line 65 encloses the outside of the transit pass confirmation line 66.

Figure 11:
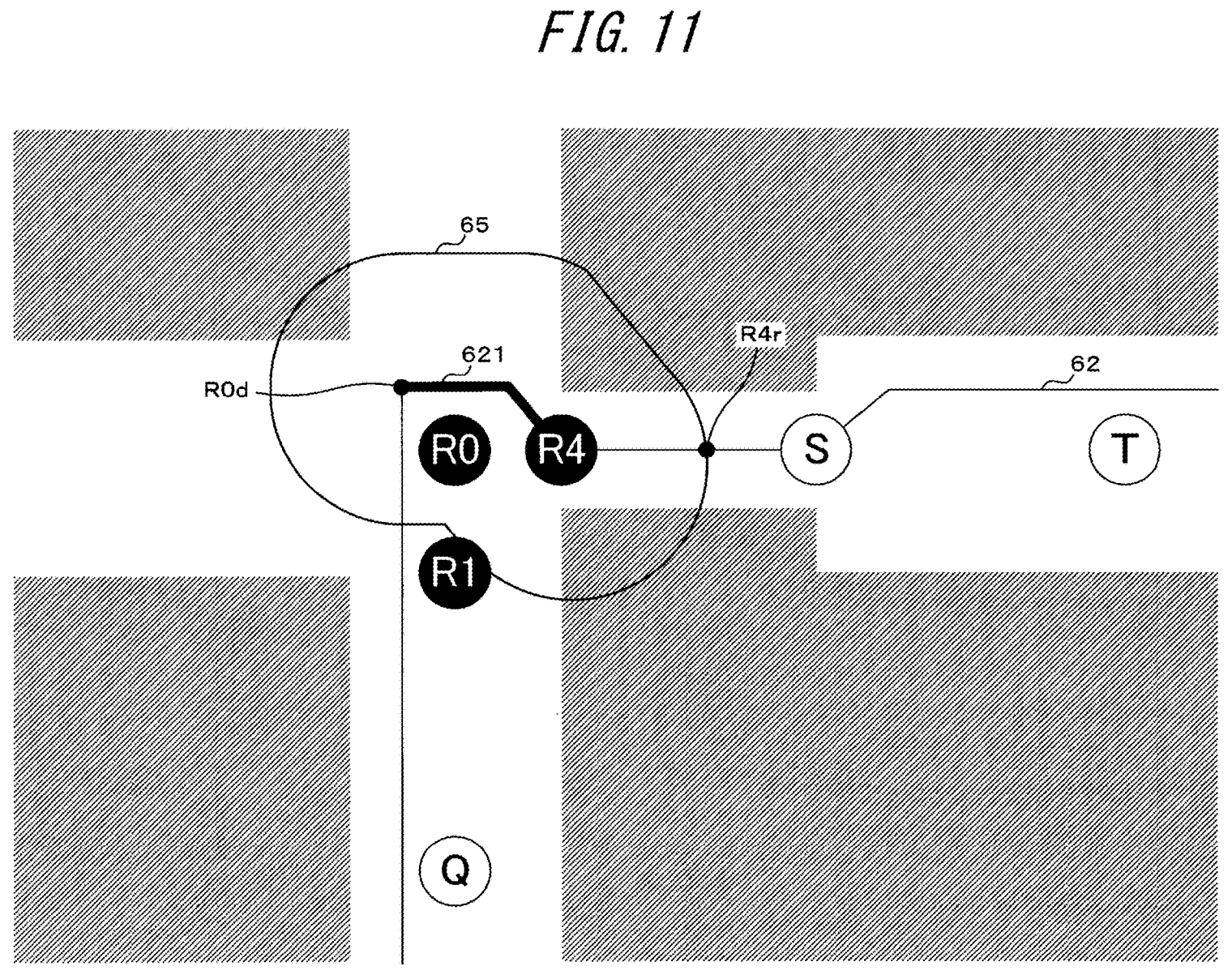

Similarly in FIG. 11, the broken line connecting point R0*d* and node R4 is the offset link of the link from node R0 to node R4. The distance between the offset link and the transit pass request line 65 and the distance between the offset link and the transit pass confirmation line 66 are equal to the distances determined for the incoming links at the same intersection.

Although omitted from the drawings, the transit pass request line 65 and the transit pass confirmation line 66 are similarly defined for the bottleneck link from node R4 to node S. As explained with reference to FIG. 5, the link from node S to node T does not require a transit pass, so neither the transit pass request line 65 nor the transit pass confirmation line 66 are defined.

The explanation continues with reference to FIGS. 2 and 9. At the travel start position indicated by the triangle in FIG. 2, the control unit 41 instructs the drive apparatus 36 to travel along a portion of the second route 62 to point R1*ck*, which is the position where the second route 62 first intersects the transit pass confirmation line 66. In the following explanation, the route that the control unit 41 instructs the drive apparatus 36 to travel is described as a partial route 68. In FIG. 9, the partial route 68 up to point R1*ck* is indicated by a bold line.

The drive apparatus 36 controls the tires 37 for the mobile body 30 to travel along the partial route 68. As described above, in a case in which the sensor 34 detects an obstacle 71, the drive apparatus 36 automatically stops or diverts the mobile body 30. In a case in which the obstacle 71 is another mobile body 30 traveling in the same direction, the control unit 41 causes the mobile body 30 to travel while maintaining an appropriate distance. The control unit 41 determines the current position of the mobile body 30 when necessary based on information such as information acquired from the sensor 34.

In a case in which the mobile body 30 reaches point R1*rq*, which is the intersection of the second route 62 and the transit pass request line 65, the control unit 41 transmits an issuance request to the server 20 for a transit pass related to travel after point R1*ck*. In the case of consecutive links for which a transit pass is required, the control unit 41 transmits an issuance request for the transit passes collectively.

Specifically, the control unit 41 transmits an issuance request to the server 20 for a "Pass-C1" transit pass in order to enter the intersection from node R1. At the same time as the issuance request for the "Pass-C1" transit pass, the control unit 21 also transmits an issuance request to the server 20 for a "Pass-N1" transit pass, which is required to travel on the bottleneck link from node R4 to node S immediately after passing through the intersection.

Even when a link not requiring a transit pass is included along the route, the control unit 41 transmits an issuance request for transit passes collectively in a case in which the transit pass request lines 65 of the links requiring a transit pass overlap with each other. This case is illustrated specifically with reference to FIG. 12.

Figure 12:
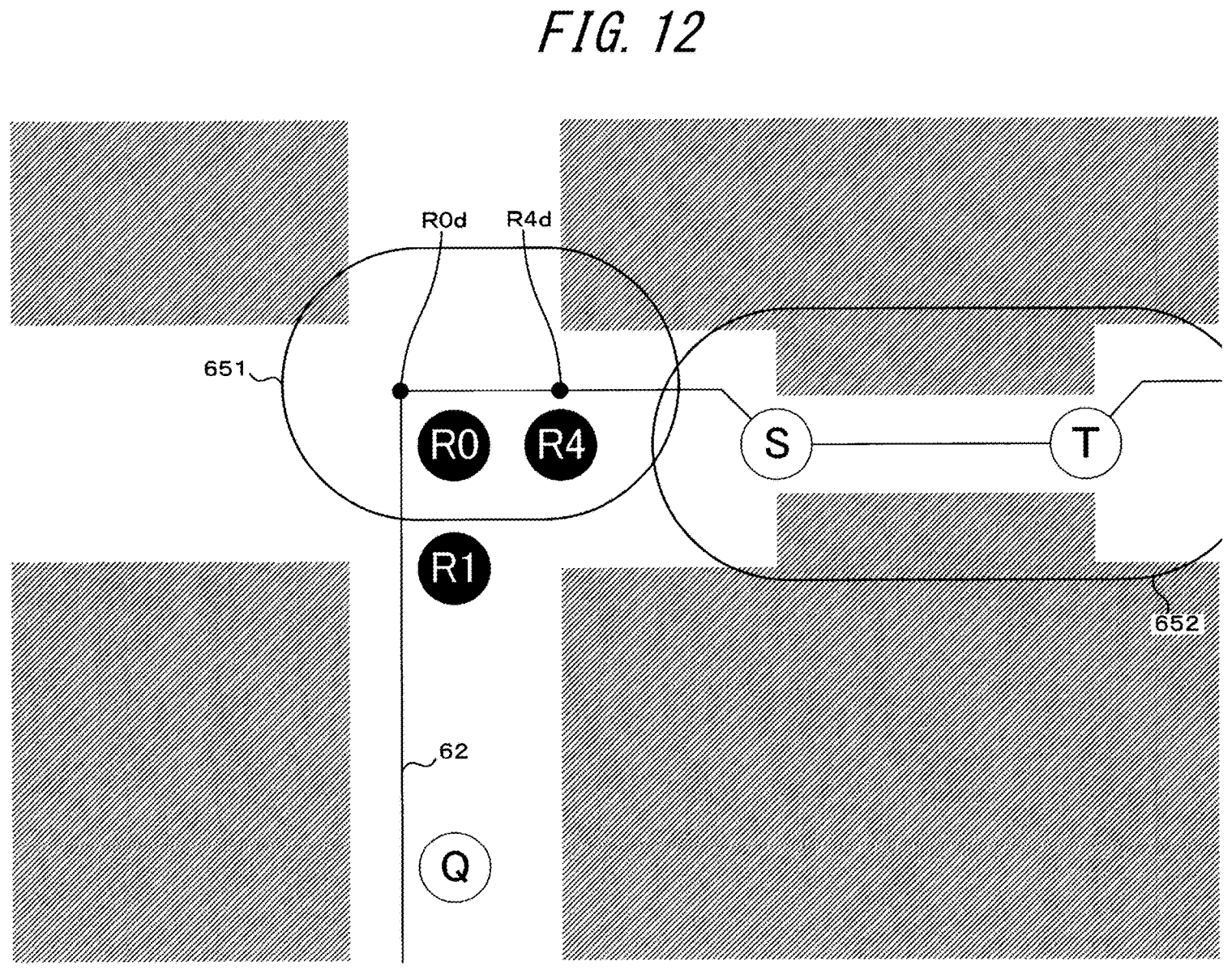

In FIG. 12, passing is possible between node R4 and node S, and a transit pass is not required. Between node S and node T is a bottleneck link where passing is not possible, and a "Pass-N2" transit pass is required. The second route 62 is offset to the left of the link up to a point just before node S and is not offset from the link between node S and node T.

In FIG. 12, the line connecting points R0*d* and R4*d* is the offset link of the link from node R0 to node R4. A transit pass request line 651, illustrated as a solid line, is a curve that surrounds the offset link at the request distance. A transit pass request line 652, illustrated as a solid line, is a curve that surrounds the link from node S to node T at the request distance.

In the example illustrated in FIG. 12, the transit pass request line 651 and the transit pass request line 652 intersect. In such a case, the control unit 41 simultaneously transmits an issuance request for the "Pass-N2" transit pass, which is required to travel on the bottleneck link, at the same time as the "Pass-C1", which is required to travel through the intersection. In this way, it is possible to prevent the mobile body 30 waiting for the issuance of a transit pass from being stuck between links requiring transit passes.

Issuance of the transit pass on the server 20 is described below. The explanation now returns to FIG. 9. In a case in which the mobile body 30 has not received a transit pass before reaching point R1*ck*, the control unit 41 does not indicate the route to be traveled after point R1*ck* to the drive apparatus 36. The drive apparatus 36 stops the mobile body 30 at point R1*ck*. The mobile body 30 remains stopped and waits until the transit pass is issued.

Figure 10:
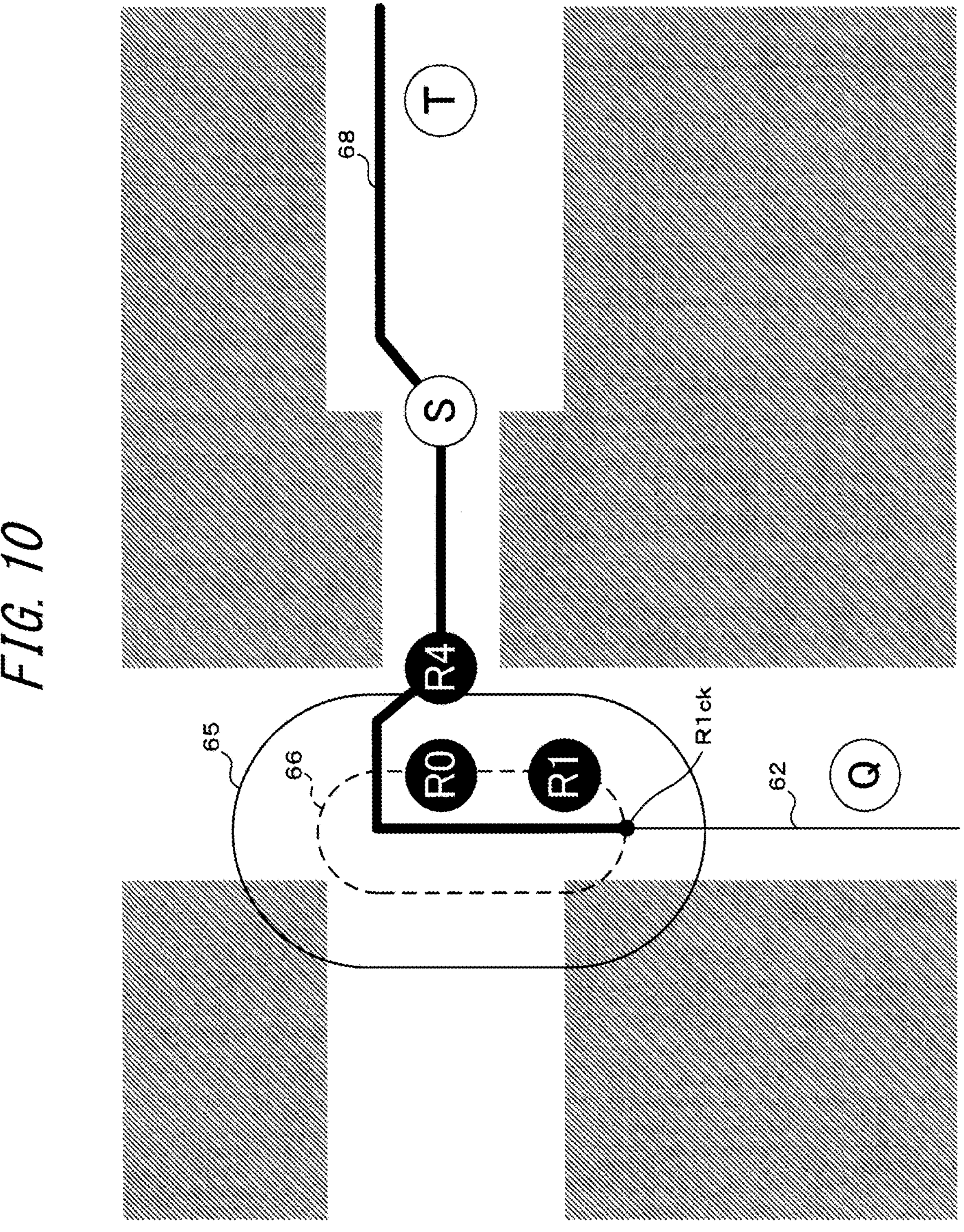
FIG. 10 is a diagram illustrating transit passes.

In a case in which the transit pass is received, the control unit 41 instructs the drive apparatus 36 to travel the partial route 68 to the next location where a transit pass is needed, as illustrated in FIG. 10. The end point of the partial route 68 indicated here is before the intersection node U illustrated in FIG. 2. The drive apparatus 36 causes the mobile body 30 to travel along the indicated partial route 68.

The explanation continues with reference to FIG. 11. When the mobile body 30 passes through the intersection and reaches point R4*r*, which is the intersection of the second route 62 and the transit pass request line 65, the control unit 41 returns the "Pass-C1" transit pass for the intersection to the server 20. The server 20 updates the mobile body DB 54 to record that the transit pass has been returned.

While omitted from the drawings, when the mobile body 30 passes through node S and reaches the transit pass request line 65 of the link from node R4 to node S, the control unit 41 returns the "Pass-N1" transit pass, required for traveling on the bottleneck link, to the server 20. In addition to the request distance, information defining the position where the transit pass is to be returned may be recorded in the link DB 53.

The following is an overview of the processing performed by control unit 21 when a request for a transit pass is received. The control unit 21 determines whether a transit pass has already been issued to another mobile body 30 traveling on a route that interferes with the route for which a transit pass has been requested. In a case in which a transit pass has not been issued to another mobile body 30, the control unit 21 determines that the requested transit pass is issuable. In a case in which a transit pass has been issued to another mobile body 30, the control unit 21 waits until the transit pass is returned from the other mobile body 30.

A specific example is illustrated with reference to FIG. 7. In the following description, the other mobile body 30, which is different from the mobile body 30 that requested the transit pass to enter the intersection from node R1 and exit from node R4, is referred to as the second mobile body. The control unit 21 searches the transit pass field of the mobile body DB 54 to determine whether "Pass-C1" and "Pass-N1" transit passes requested by the control unit 41 have been issued to the other mobile body 30.

In a case in which it is determined that none of the transit passes has been issued, the control unit 21 issues the "Pass-C1" and "Pass-N1" transit passes to the mobile body 30 collectively. The control unit 21 records the transit pass ID of the issued transit passes in the transit pass field of the record corresponding to the mobile body 30 in the mobile body DB 54.

Processing is now described for the case in which a "Pass-C1" transit pass required to travel through the intersection has been issued to the second mobile body. For example, the travel route of the second mobile body entering the intersection from node R2 or node R3 interferes with the travel route of the mobile body 30, regardless of whether the second mobile body travels straight or turns right or left. Similarly, the travel route of the second mobile body entering the intersection from node R4 and traveling straight or turning right also interferes with the travel route of the mobile body 30.

Thus, in a case in which a "Pass-C1" transit pass has been issued to a second mobile body with an interfering travel route, the control unit 21 determines that a "Pass-C1" transit pass cannot be issued to the mobile body 30 until the transit pass is returned from the second mobile body.

In a case in which a "Pass-C1" transit pass has been issued to a plurality of second mobile bodies, the control unit 21 determines that a "Pass-C1" transit pass cannot be issued to the mobile body 30 if there is even one second mobile body with an interfering travel route.

In a case in which the mobile body 30 travels on the left side, the control unit 21 can operate efficiently by determining whether interference exists in clockwise order starting with the second mobile body entering the intersection from the link to the left of the mobile body 30, and terminating the processing upon finding an interfering second mobile body. In a case in which the mobile body 30 travels on the right side, it is preferable to determine whether interference exists in counterclockwise order, starting with the second mobile body entering the intersection from the link to the right of the mobile body 30.

Because of the offsetting within the intersection represented by node R0 to node R4 as described above, the travel route of the second mobile body entering the intersection from node R4 and turning left does not interfere with the travel route of the mobile body 30. Thus, in a case in which a "Pass-C1" transit pass has been issued only to a second mobile body with a non-interfering travel route, the control unit 21 determines that a "Pass-C1" transit pass is also issuable to the mobile body 30.

Even in a case of determining that a "Pass-C1" transit pass is issuable, the control unit 21 does not immediately issue the transit pass to the mobile body 30. The control unit 21 temporarily stores the fact that a "Pass-C1" transit pass is issuable in the main storage apparatus 22 or the auxiliary storage apparatus 23. The control unit 21 determines whether another transit pass that the mobile body 30 requested at the same time as the "Pass-C1" transit pass, i.e., the "Pass-N1" transit pass in the example illustrated in FIG. 7, is issuable.

Processing is now described for the case in which a "Pass-N1" transit pass required to travel through the bottleneck link has been issued to the second mobile body. A plurality of mobile bodies 30 traveling in the same direction can travel on the bottleneck link at the same time. Therefore, in a case in which the second mobile body travels from node R4 to node S on the bottleneck link, i.e., in a case in which the mobile body 30 and the second mobile body travel on the same link, the control unit 21 determines that a "Pass-N1" transit pass can also be issued to the mobile body 30.

However, in a case in which the second mobile body travels from node S to node R4 on the bottleneck link, i.e., in a case of travel on the link in the opposite direction from the mobile body 30, the control unit 21 determines that a "Pass-N1" transit pass cannot be issued to the mobile body 30 until the "Pass-N1" transit pass is returned from the second mobile body.

Even in a case of determining that a "Pass-N1" transit pass is issuable, the control unit 21 does not immediately issue the transit pass to the mobile body 30. The control unit 21 temporarily stores the fact that a "Pass-N1" transit pass is issuable in the main storage apparatus 22 or the auxiliary storage apparatus 23. The control unit 21 repeats the determination of issuability of each transit pass until all the transit passes requested by the mobile body 30 are issuable.

In a case in which a predetermined number of "Pass-N1" transit passes has been issued, the control unit 21 may suspend issuing "Pass-N1" transit passes to mobile bodies 30 traveling in the same direction and issue "Pass-N1" transit passes to mobile bodies 30 traveling in the opposite direction after all of the "Pass-N1" transit passes have been returned. This can prevent a phenomenon in which only mobile bodies 30 traveling in one direction continuously travel on the bottleneck link, while the mobile bodies 30 traveling in the opposite direction are stuck waiting for a long time.

In a case in which it is determined that both "Pass-C1" and "Pass-N1" are issuable, the control unit 21 issues these transit passes collectively to the mobile body 30 that requested the transit passes. The control unit 21 records the transit pass ID of the issued transit passes in the transit pass field of the record corresponding to the mobile body 30 in the mobile body DB 54.

In a case in which a transit pass is returned from the mobile body 30, the control unit 21 updates the mobile body DB 54 and removes the returned transit pass from the transit pass field. As a result of the above processing, the status of the issuance of transit passes is recorded when necessary in the mobile body DB 54.

For clarity, the case in which the mobile body 30 travels a route from node R1 to node R3, going straight through the intersection, is also described. The control unit 41 transmits an issuance request to the server 20 for a "Pass-C1" transit pass for passage through the intersection. The control unit 21 searches the transit pass field of the mobile body DB 54 to determine whether the "Pass-C1" transit pass requested by the control unit 41 has been issued to another mobile body 30. In a case in which a transit pass has not been issued to another mobile body 30, the control unit 21 determines that the "Pass-C1" is issuable to the mobile body 30.

Processing is now described for the case in which a "Pass-C1" transit pass has been issued to the second mobile body. For example, the travel route of the second mobile body entering the intersection from node R2 interferes with the travel route of the mobile body 30, regardless of whether the second mobile body travels straight or turns right or left. The travel route of the second mobile body entering the intersection from node R3 and turning right, and the travel route of the second mobile body entering the intersection from node R4 and traveling straight or turning right, also interfere with the travel route of the mobile body 30.

Thus, in a case in which a "Pass-C1" transit pass has been issued to a second mobile body with an interfering travel route, the control unit 21 determines that a "Pass-C1" transit pass cannot be issued to the mobile body 30 until the second mobile body returns the transit pass.

On the other hand, the travel route of the second mobile body entering the intersection from node R3 and turning left, and the travel route of the second mobile body entering the intersection from node R4 and turning left, do not interfere with the travel route of the mobile body 30. Thus, in a case in which a "Pass-C1" transit pass has been issued only to a second mobile body with a non-interfering travel route, the control unit 21 determines that a "Pass-C1" transit pass is also issuable to the mobile body 30.

Figure 13:
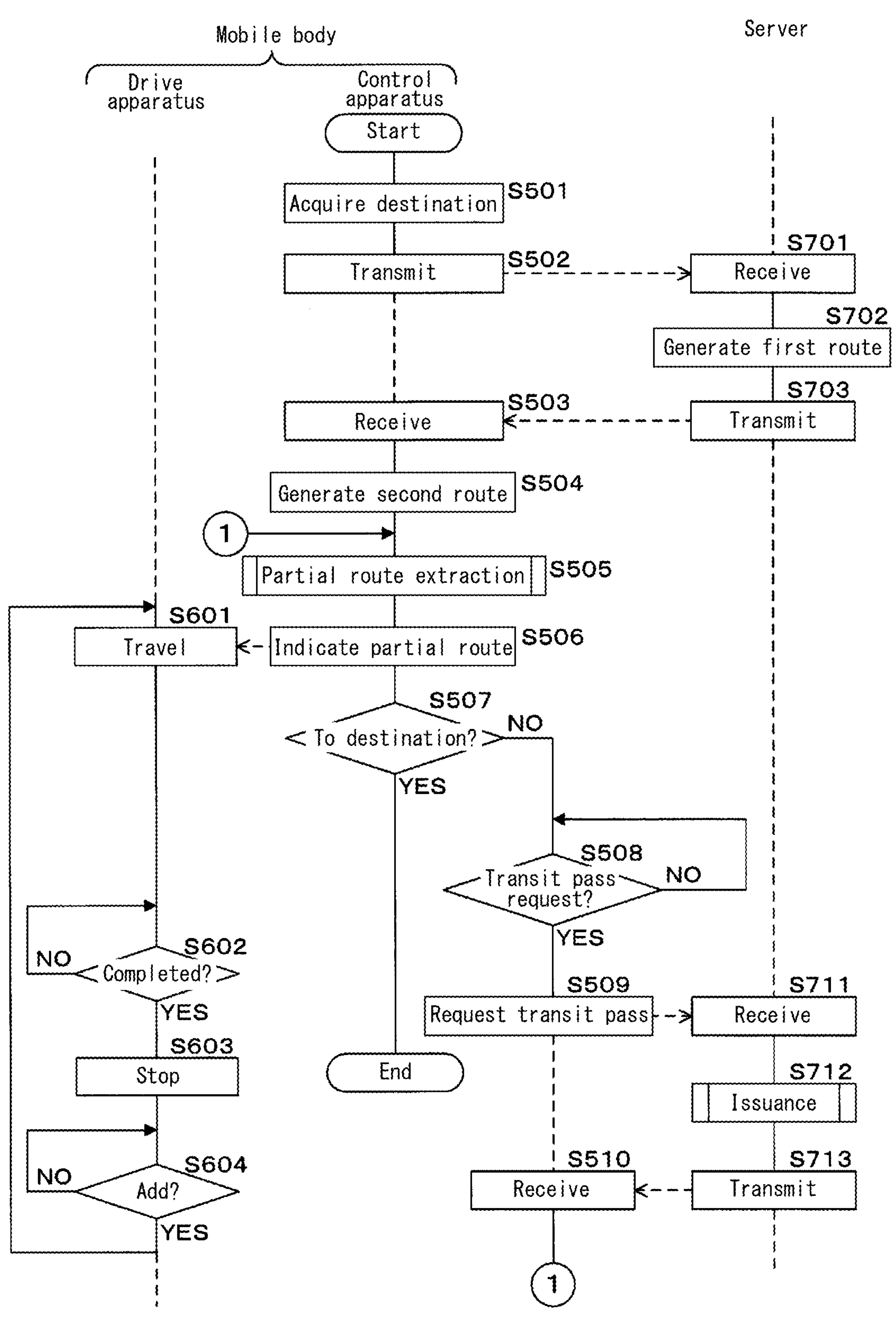
FIG. 13 is a flowchart illustrating the flow of processing in a program.

FIG. 13 is a flowchart illustrating the flow of processing in a program. The control unit 41 acquires a destination designated by a user who has boarded the mobile body 30 (step S501). For example, the control unit 41 displays a list of destinations on the touch panel of the controller 32 and acquires the destination selected by the user. The control unit 41 may display a map on the touch panel of the controller 32 and acquire the destination tapped by the user. The control unit 41 may acquire the destination by voice recognition via a microphone. The control unit 41 may read an airline ticket or boarding pass held by the user and acquire the destination, such as the departure gate to which the user should head, via the network.

The control unit 41 transmits the destination to the server 20 (step S502). The control unit 21 receives the destination (step S701). The control unit 21 generates the first route 61 based on the current position of the mobile body 30, which is acquired when necessary and recorded in the mobile body DB 54, and the received destination (step S702). The control unit 21 may transmit the current position and destination to an external map server or the like to acquire the first route 61 generated by the map server.

The control unit 21 transmits information about the first route 61 to the mobile body 30 (step S703). The information about the first route 61 includes the node sequence, the coordinates of each node, and the travel condition of each link connecting the nodes. The travel condition includes the offset.

The control unit 21 receives information about the first route 61 (step S503). The control unit 41 generates the second route 62 as described with reference to FIG. 8 (step S504). Specifically, the control unit 41 translates each link by the offset to generate the second route 62.

The control unit 41 calls a subroutine for partial route extraction (step S505). The subroutine for partial route extraction is a subroutine for extracting, from the second route 62, the partial route 68 on which the drive apparatus 36 is instructed to travel and extracting transit passes to request from the server 20 at the end point of the partial route 68. The process flow of the subroutine for partial route extraction is described below.

The control unit 41 indicates the extracted partial route 68 to the drive apparatus 36 (step S506). The drive apparatus 36 controls the tires 37 for the mobile body 30 to travel on the partial route 68 (step S601). The control unit 41 determines whether the end point of the partial route 68 extracted in step S505 is the destination (step S507). In a case in which the end point is determined to be the destination (YES in step S507), the control unit 41 terminates the process.

In a case in which it is determined that the end point is not the destination (NO in step S507), the control unit 41 determines whether the mobile body 30 has reached the position for requesting the transit passes, i.e., the position corresponding to point R1_rq_ described with reference to FIG. 9 (step S508). As described above, the control unit 41 may determine the current position of the mobile body 30 when necessary based on a GPS sensor, markers, beacons, or the like.

In a case in which it is determined that the position for requesting the transit passes has not been reached (NO in step S508), the control unit 41 returns to step S508. In a case in which it is determined that the position for requesting the transit passes has been reached (YES in step S508), the control unit 41 transmits an issuance request for the transit passes extracted in step S505 to the server 20 (step S509).

The control unit 21 receives the request for the transit passes (step S711). The control unit 21 calls a subroutine for issuance (step S712). The subroutine for issuance is a subroutine for issuing transit passes when all the requested transit passes are issuable. The process flow of the subroutine for issuance is described below. The control unit 21 transmits the issued transit passes to the mobile body 30 (step S713).

The control unit 41 receives and temporarily stores the issued transit passes in the auxiliary storage apparatus 43 or the main storage apparatus 42 (step S510). The control unit 41 returns to step S505. The transit passes received in step S510 are used in the subroutine for partial route extraction, which is called in step S505.

Based on the current position of the mobile body 30, the drive apparatus 36 determines whether travel of the partial route 68 indicated by the control unit 41 has been completed (step S602). In a case in which travel has not been completed (NO in step S602), the drive apparatus 36 returns to step S602. In a case in which travel has been completed (YES in step S602), the drive apparatus 36 stops the mobile body 30 at the end point of the partial route 68 (step S603).

The drive apparatus 36 determines whether the partial route 68 has been supplemented by the control unit 41 (step S604). In a case in which the partial route 68 has not been supplemented (NO in step S604), the drive apparatus 36 returns to step S604 and waits until the partial route 68 is supplemented. In a case in which the partial route 68 has been supplemented (YES in step S604), the drive apparatus 36 returns to step S601 and resumes travel.

As a result of the above processing, in a case in which the control unit 41 receives the transit passes (step S510) and indicates the partial route 68 to the drive apparatus 36 (step S506) before the mobile body 30 reaches point R1_ck_ described with reference to FIG. 9, the mobile body 30 travels along the second route 62 without stopping. In a case in which the control unit 41 has not received the transit passes when the mobile body 30 reaches point R1_ck_, the mobile body 30 stops at point R1_ck_ and waits until the control unit 41 supplements the partial route 68.

Figure 14:
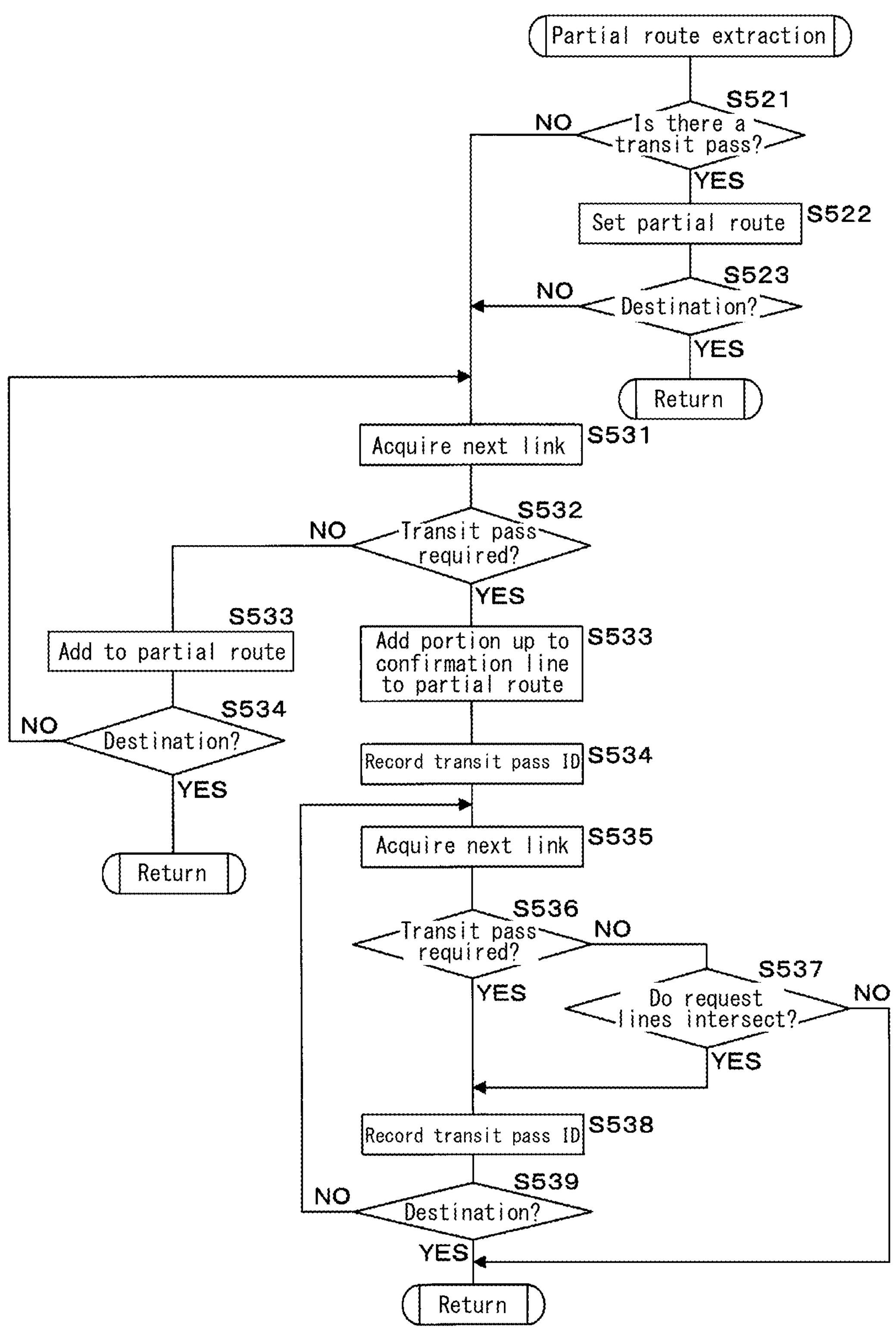
FIG. 14 is a flowchart illustrating the flow of processing in a subroutine for partial route extraction.

FIG. 14 is a flowchart illustrating the flow of processing in the subroutine for partial route extraction. When this subroutine is called, the control unit 41 initializes the partial route 68 to a state in which no route is recorded.

The control unit 41 determines whether a transit pass issued by the server 20 is recorded in the auxiliary storage apparatus 43 or the main storage apparatus 42 (step S521). In a case in which the control unit 41 calls the subroutine for partial route extraction for the first time after the user boards the mobile body 30 and designates the destination (step S501), no transit pass is recorded. In a case in which the subroutine for partial route extraction is called for the second time onward, a transit pass has been recorded by the previous process in step S506 to step S510.

In a case in which it is determined that a transit pass is recorded (YES in step S521), the control unit 41 extracts the second route 62 in the range for which the transit pass is recorded and sets the extracted portion as the partial route 68 (step S522). The control unit 41 determines whether the end point of the partial route 68 is the destination (step S523). In a case in which the end point is determined to be the destination (YES in step S523), the control unit 41 terminates the process.

In a case in which it is determined that no transit pass is recorded (NO in step S521) or that the end point is not the destination (NO in step S523), the control unit 41 searches the link DB 53 to retrieve a record for the link on which the mobile body 30 will next travel (step S531). The control unit 41 determines whether a transit pass is required to travel on the link by referring to the transit pass ID field (step S532).

In a case in which it is determined that a transit pass is not required (NO in step S532), the control unit 41 extracts the portion corresponding to the link from the second route 62 and adds the portion to the partial route 68 (step S533). The control unit 41 determines whether the end point of the partial route 68 is the destination (step S534). In a case in which the end point is determined to be the destination (YES in step S534), the control unit 41 terminates the process. In a case in which it is determined that the end point is not the destination (NO in step S534), the control unit 41 returns to step S531.

In a case in which it is determined that a transit pass is required (YES in step S532), the control unit 41 extracts the portion corresponding to the link from the second route 62 and adds a portion up to the first intersection with the transit pass confirmation line 66 to the partial route 68 (step S533).

The control unit 41 records the transit pass ID of the transit pass determined to be required in step S532 in the auxiliary storage apparatus 43 or the main storage apparatus 42 (step S534). The control unit 41 searches the link DB 53 to retrieve a record related to the link on which the mobile body 30 will travel next (step S535). The control unit 41 determines whether a transit pass is required to travel on the link by referring to the transit pass ID field (step S536).

In a case in which it is determined that a transit pass is not required (NO in step S536), the control unit 41 retrieves a record, from the link DB 53, related to the link on which the mobile body 30 will travel next and determines whether a link such that transit pass request lines 65 intersect, as described with reference to FIG. 12, exists (step S537). The control unit 41 repeats the process of step S537 until reaching a link that is far enough along the second route 62 from the link for which a transit pass was determined to be required in step S532, i.e., until reaching a link where there is no possibility of the transit pass request lines 65 intersecting.

In a case in which it is determined that a transit pass is required (YES in step S536), or that there exists a link such that transit pass request lines 65 intersect (YES in step S537), the control unit 41 records the transit pass ID for the link in the auxiliary storage apparatus 43 or the main storage apparatus 42 (step S538).

The control unit 41 determines whether the process for the links until the destination is reached has been completed (step S539). In a case in which the process has not been completed (NO in step S539), the control unit 41 returns to step S535. In a case in which it is determined that the process has been completed (YES in step S539), or that there is no link such that transit pass request lines 65 intersect (NO in step S537), the control unit 41 terminates the process.

In step S509 described with reference to FIG. 13, the control unit 41 transmits an issuance request to the server 20 for the transit passes corresponding to the transit pass IDs recorded in steps S534 and S538.

Figure 15:
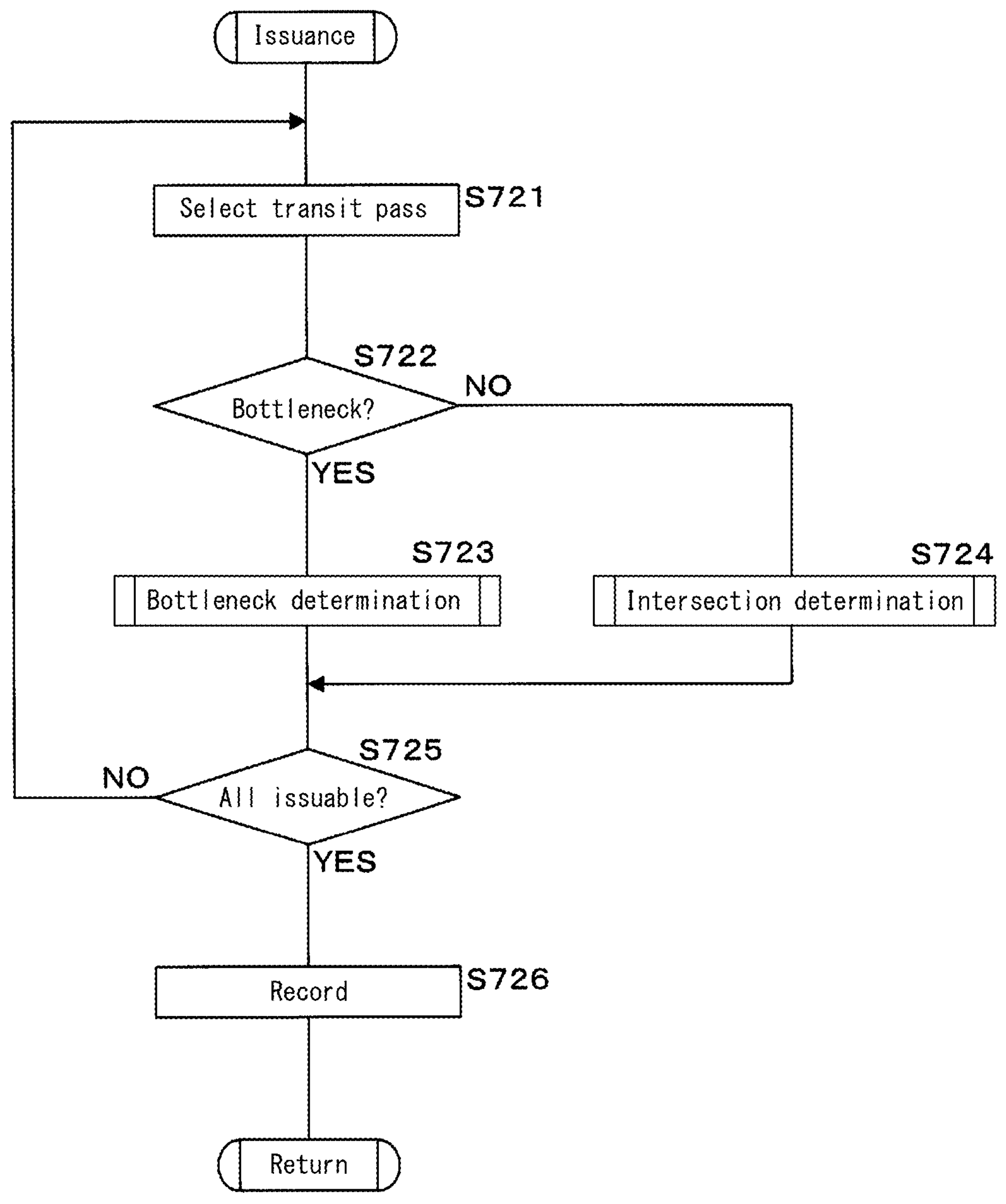
FIG. 15 is a flowchart illustrating the flow of processing in a subroutine for issuance.

FIG. 15 is a flowchart illustrating the flow of processing in the subroutine for issuance. The subroutine for issuance is a subroutine for issuing transit passes when all the requested transit passes are issuable. The control unit 21 selects, from among the transit passes requested by the mobile body 30, a transit pass that has not been determined to be issuable (step S721).

The control unit 21 searches the link DB 53 using the transit pass ID of the selected transit pass as a key and extracts the corresponding record. The control unit 21 refers to the type field of the extracted record to determine whether the transit pass being processed is a transit pass related to a bottleneck link (step S722).

In a case of determination of relation to a bottleneck link (YES in step S722), the control unit 21 calls the subroutine for bottleneck determination (step S723). The subroutine for bottleneck determination is a subroutine for determining whether a transit pass is issuable for a bottleneck link. The process flow of the subroutine for bottleneck determination is described below.

In a case of determination of no relation to a bottleneck link (NO in step S722), the control unit 21 calls the subroutine for intersection determination (step S724). The subroutine for intersection determination is a subroutine for determining whether a transit pass is issuable for an intersection link. The process flow of the subroutine for intersection determination is described below.

After completion of step S723 or step S724, the control unit 21 determines whether all the requested transit passes are issuable (step S725). In a case in which it is determined that not all of the transit passes are issuable (NO in step S725), the control unit 21 returns to step S721. In a case in which it is determined that all the transit passes are issuable (YES in step S725), the control unit 21 records the transit pass ID of the transit pass to be issued in the transit pass field of the mobile DB 54 (step S726). The control unit 21 then terminates the process.

Figure 16:
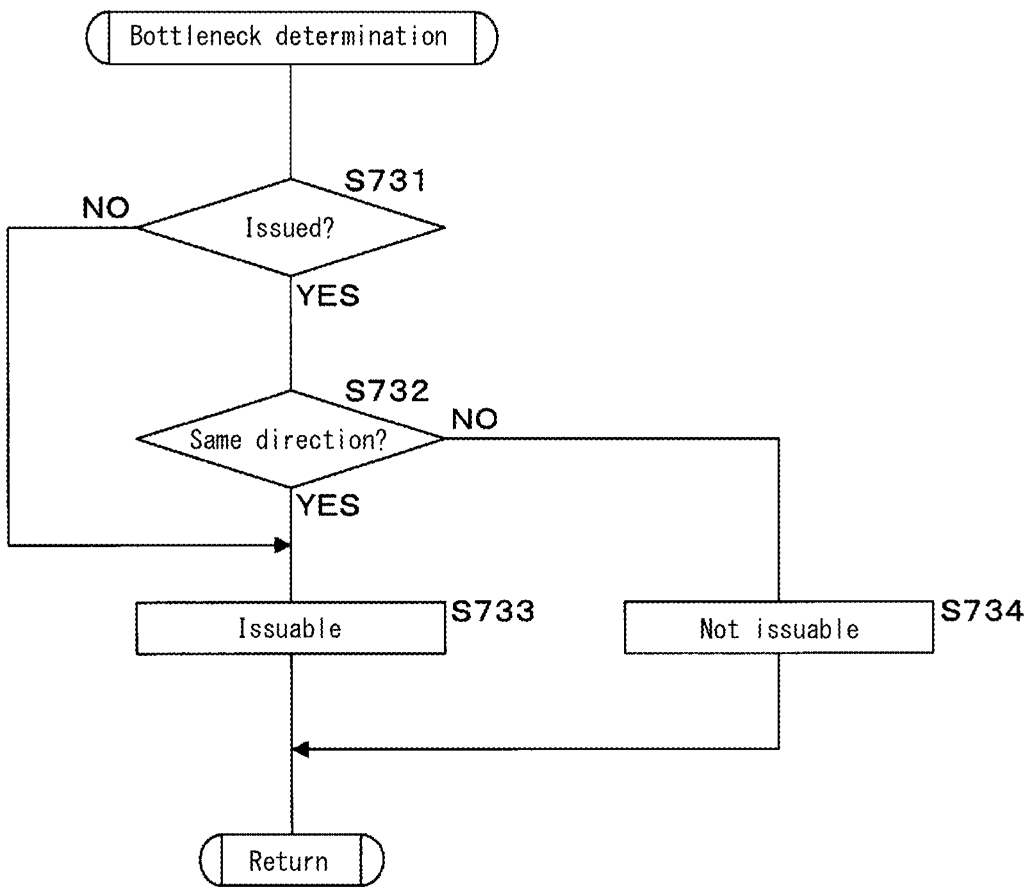
FIG. 16 is a flowchart illustrating the flow of processing in a subroutine for bottleneck determination.

FIG. 16 is a flowchart illustrating the flow of processing in the subroutine for bottleneck determination. The subroutine for bottleneck determination is a subroutine for determining whether a transit pass is issuable for a bottleneck link.

The control unit 21 searches the transit pass field of the mobile body DB 54 to determine whether a transit pass that is the same as the transit pass being processed has been issued to another mobile body 30 (step S731). In a case in which it is determined that such a transit pass has been issued (YES in step S731), the control unit 21 refers to the route field of the mobile body 30 for which the transit pass has been issued to determine whether the bottleneck link is traveled in the same direction (step S732).

In a case in which it is determined that the bottleneck link is traveled in the same direction (YES in step S732), or that the transit pass has not been issued (NO in step S731), the control unit 21 determines that the transit pass being processed is issuable (step S733). The control unit 21 preferably sets a flag for provisional issuance or the like for the transit pass being processed to prevent issuance to another mobile body 30.

In a case in which it is determined that the bottleneck link is traveled in opposite directions (NO in step S732), the control unit 21 determines that the transit pass being processed is not issuable (step S734). After completion of step S733 or step S734, the control unit 21 terminates the process.

Figure 17:
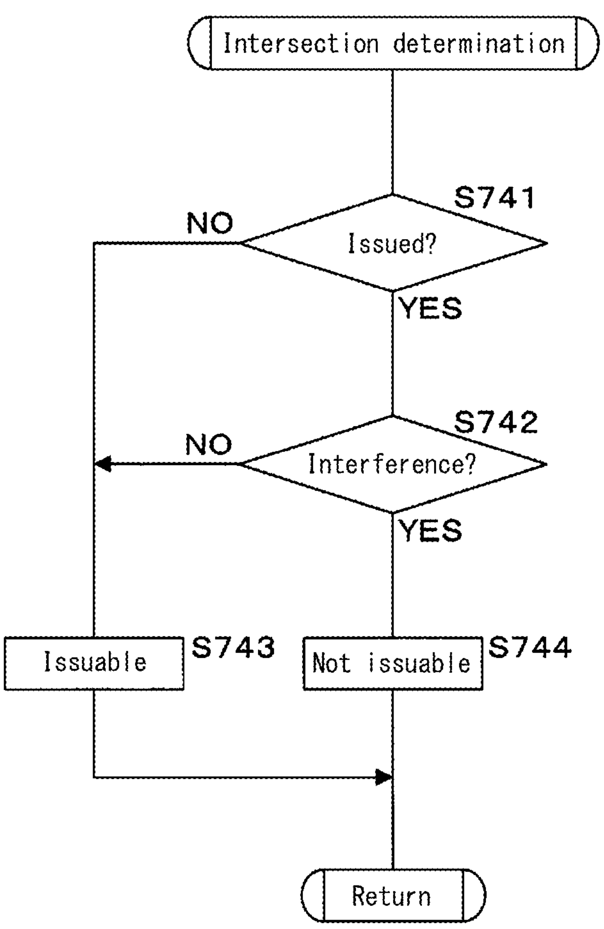
FIG. 17 is a flowchart illustrating the flow of processing in a subroutine for intersection determination.

FIG. 17 is a flowchart illustrating the flow of processing in the subroutine for intersection determination. The subroutine for intersection determination is a subroutine for determining whether a transit pass is issuable for an intersection link.

The control unit 21 searches the transit pass field of the mobile body DB 54 to determine whether a transit pass that is the same as the transit pass being processed has been issued to another mobile body 30 (step S741). In a case in which it is determined that such a transit pass has been issued (YES in step S741), the control unit 21 refers to the route field of the mobile body 30 for which the transit pass has been issued to determine whether the travel route interferes (step S742).

In a case in which it is determined that the travel route does not interfere (NO in step S742), or that the transit pass has not been issued (NO in step S741), the control unit 21 determines that the transit pass being processed is issuable (step S743). The control unit 21 preferably sets a flag for provisional issuance or the like for the transit pass being processed to prevent issuance to another mobile body 30.

In a case in which it is determined that the travel route interferes (YES in step S742), the control unit 21 determines that the transit pass being processed is not issuable (step S744). After completion of step S743 or step S744, the control unit 21 terminates the process.

According to the present embodiment, an information processing method and the like that realize autonomous travel of the mobile body 30 that supports the movement of people who have difficulty walking long distances on their own can be provided. Since the second route 62 is generated by offsetting based on the first route 61, which is expressible by a node sequence, simple map data 51 that is easy to update can be used.

The use of transit passes at intersection links and bottleneck links to control entry can prevent contact and collisions between mobile bodies 30. Since the server 20 does not need to control each of the mobile bodies 30 in real time at intersections and bottlenecks, the amount of communication between the mobile bodies 30 and the server 20 can be reduced.

Setting the transit pass request line 65 and the transit pass confirmation line 66 in links where a transit pass is required enables provision of an information processing system 10 in which a mobile body 30 can continue traveling without stopping when a transit pass is issued smoothly. In a case in which links requiring a transit pass are contiguous or in close proximity, the transit passes can be issued collectively, thereby preventing the mobile body 30 waiting for a transit pass from being stuck at locations such as an intersection or bottleneck.

Determination of whether to issue a transit pass based on whether there is interference with a mobile body 30 that has already been issued a transit pass enables provision of an information processing system 10 that manages the issuance of transit passes with a simple algorithm.

It is possible to provide an information processing system 10 that reduces the time that mobile bodies 30 have to wait for issuance of a transit pass, since in a case in which travel routes do not interfere, transit passes for the same intersection or bottleneck are issued to a plurality of mobile bodies 30.

The map data 56 recorded in the respective mobile bodies 30 may contain a database similar to the node DB 52 and the link DB 53. In such a case, the control unit 21 transmits only the node sequence indicating the first route 61 in step S703 described with reference to FIG. 13. Based on the received node sequence, the control unit 41 refers to the database to retrieve the coordinates of each node and the travel conditions of each link and generates the second route 62.

Since the first route 61 from the server 20 to the mobile body 30 is indicated by a node sequence, the amount of communication between the mobile body 30 and the server 20 can be reduced. A small amount of communication enables provision of an information processing system 10 that is less prone to problems such as communication delays and congestion, even when a large number of mobile bodies 30 are connected to the server 20.

In step S501 described with reference to FIG. 13, the control unit 41 may accept a designation of a facility or the like, such as “restroom” or “convenience store”, of which more than one are provided within the area reachable by the mobile body 30. In step S702, the control unit 21 generates a first route 61 to each facility that satisfies the condition for which the designation is accepted and sets the facility with the shortest first route 61, for example, as the user’s destination. In step S703, the control unit 21 transmits the first route 61 leading to the set destination to the mobile body 30.

In a case in which the congestion at each facility can be acquired, the control unit 21 may set the user’s destination to a facility that is not crowded among the facilities for which the generated first route 61 is relatively short.

After accepting designation of the destination, the control unit 41 may accept designation of a stopover, such as a “restroom” or “convenience store”, before starting travel or during travel to the destination, for example. In a case in which designation of a stopover is accepted, the control unit 41 returns to step S501. In step S702, the control unit 21 generates a first route 61 towards the destination through each facility that satisfies the condition for which the designation is accepted and sets the facility with the shortest first route 61, for example, as the user’s stopover. In step S703, the control unit 21 transmits the first route 61 leading to the destination through the set stopover to the mobile body 30.

The processing of step S702 in a case in which designation of a stopover is accepted is further described with specific examples. In a case in which the stopover is a “restroom” and there are multiple “restrooms”, the control unit 21 generates first routes 61 that reach the destination after stopping at the respective “restrooms”. The control unit 21 compares the generated plurality of first routes 61 and selects, for example, the shortest first route 61. By selection of the first route 61, the “restroom” where the mobile body 30 stops is determined.

The control unit 41 stops the mobile body 30 at the stopover. The user manually operates the mobile body 30 and performs a task. The control unit 41 then causes the mobile body 30 to travel to the destination. With this configuration, an information processing system 10 with a stopover function can be provided.

Second Embodiment

The present embodiment relates to an information processing system 10 in which a mobile body 30 can move to another floor. A description of parts in common with the first embodiment is omitted.

Figure 18:
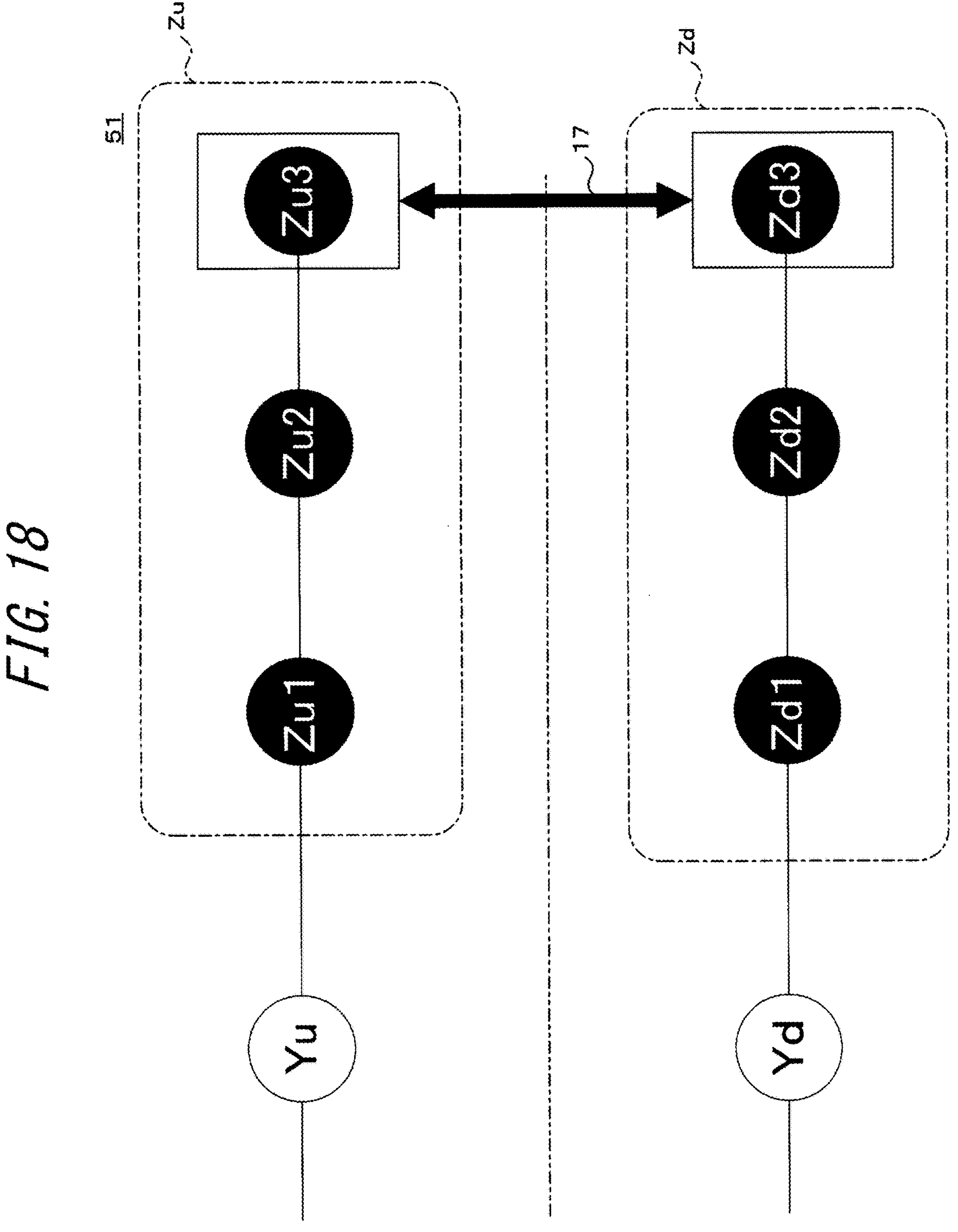
FIG. 18 is a diagram illustrating map data in a second embodiment.

FIG. 18 illustrates the map data 51 of the second embodiment. The upper side of the dashed double-dotted line illustrates floor u, and the lower side illustrates floor d. The double-sided arrow pointing up and down and the rectangles connected to both ends of the double-sided arrow indicate an elevator 17. The white circles indicate normal nodes.

The black circles indicate the elevator nodes used for boarding and exiting the elevator 17. Three elevator nodes are located on each floor, surrounded by a dashed dotted line. The elevator nodes on floor u are denoted Zu, and the elevator nodes on floor d are denoted Zd. The nodes constituting the elevator nodes are distinguished by a number at the end of Zu or Zd.

FIG. 19 is a diagram illustrating the record layout of a node DB 52 in the second embodiment. A floor field is added to the coordinate field of the node DB 52 of the first embodiment described with reference to FIG. 4. The number of the floor is recorded in the floor field.

FIG. 20 is a diagram illustrating the record layout of a link DB 53 in the second embodiment. The link DB 53 in the present embodiment has an orientation field added to the travel condition field in the link DB 53 of the first embodiment described with reference to FIG. 5. The direction the mobile body 30 faces when traveling on the link is recorded in the orientation field. A link located on floor u is described as an example.

Links "L103" through "L107" represent examples of elevator links. "Elevator" is recorded in the type field of these links. A unique transit pass ID is assigned to each elevator link. The request distance and confirmation distance are recorded in the request field and confirmation field for "L103", which is the first elevator link on which the mobile body 30 approaches the elevator 17.

The "forward" recorded in the orientation field of a link such as "L101" means that the mobile body 30 travels facing forward. The "forward→turn around" recorded in the orientation field of the link "L103" means that the mobile body 30 travels facing forward and then turns around at the end point link. The "backward" recorded in the orientation field of the "L104" link means that the mobile body 30 travels facing backward.

In a case in which the mobile body 30 can also travel in the left or right direction, there may be a record in which "right", "left", or the like is recorded in the orientation field. For example, having the mobile body 30 travel while facing to the right in front of a display window can achieve an information processing system 10 in which users can move while looking at the display window.

The link "L107" is the link on which the mobile body 30 that boarded the elevator 17 at floor u moves to floor d. Since the mobile body 30 does not actually travel itself, the offset and travel direction are not defined, and "-" is recorded in the offset field and direction field.

Figure 21:
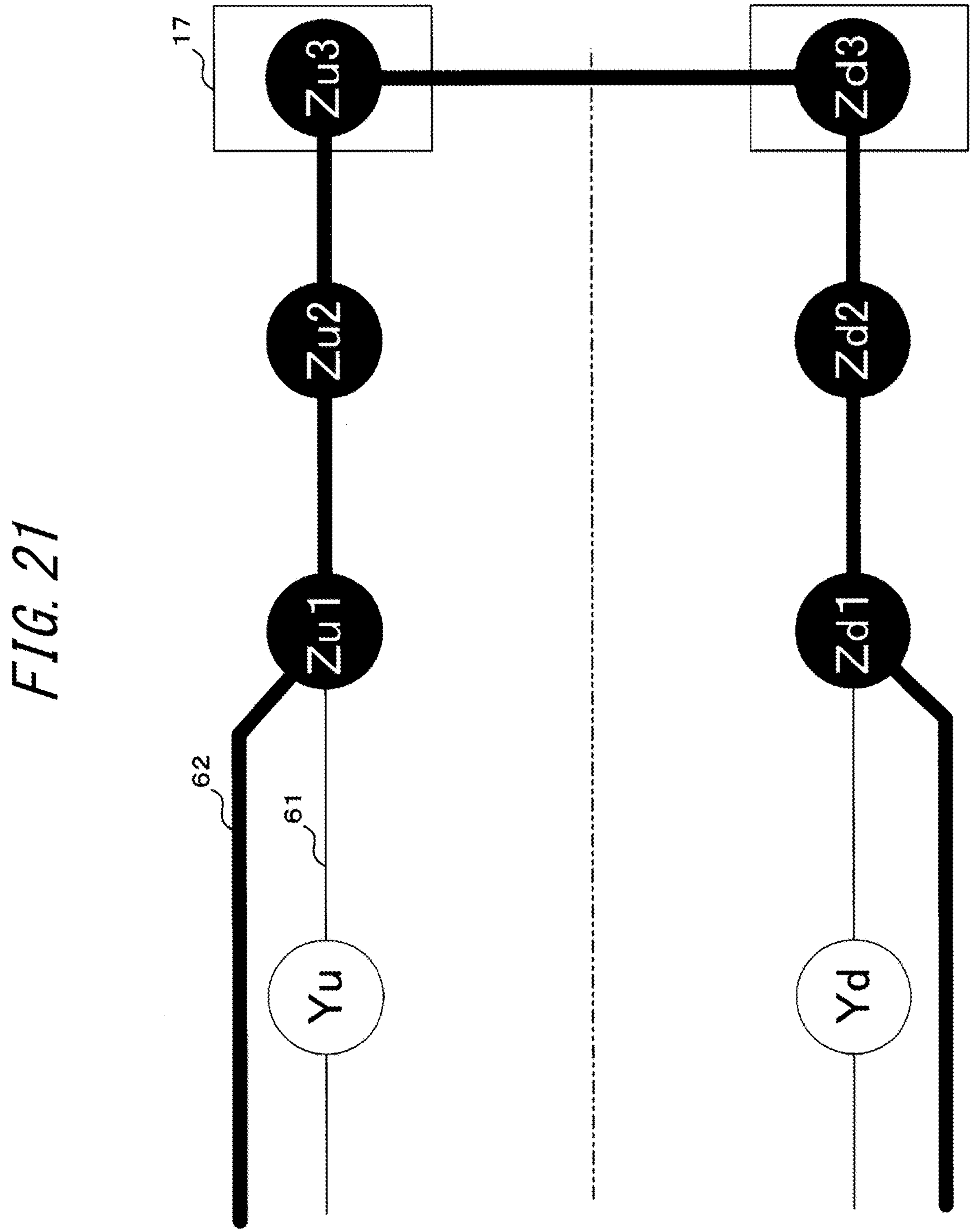
FIG. 21 is a diagram illustrating a first route and a second route in the second embodiment.

FIG. 21 is a diagram illustrating a first route 61 and a second route 62 in the second embodiment. In a case in which the current position of the mobile body 30 and the destination are on different floors, the control unit 21 generates a first route 61 that uses the elevator 17. The control unit 41 generates the second route 62 based on the first route 61. Since the offset of the elevator link is set to zero in the present embodiment, the elevator link is also a bottleneck link where mobile bodies 30 cannot pass each other.

Figure 22:
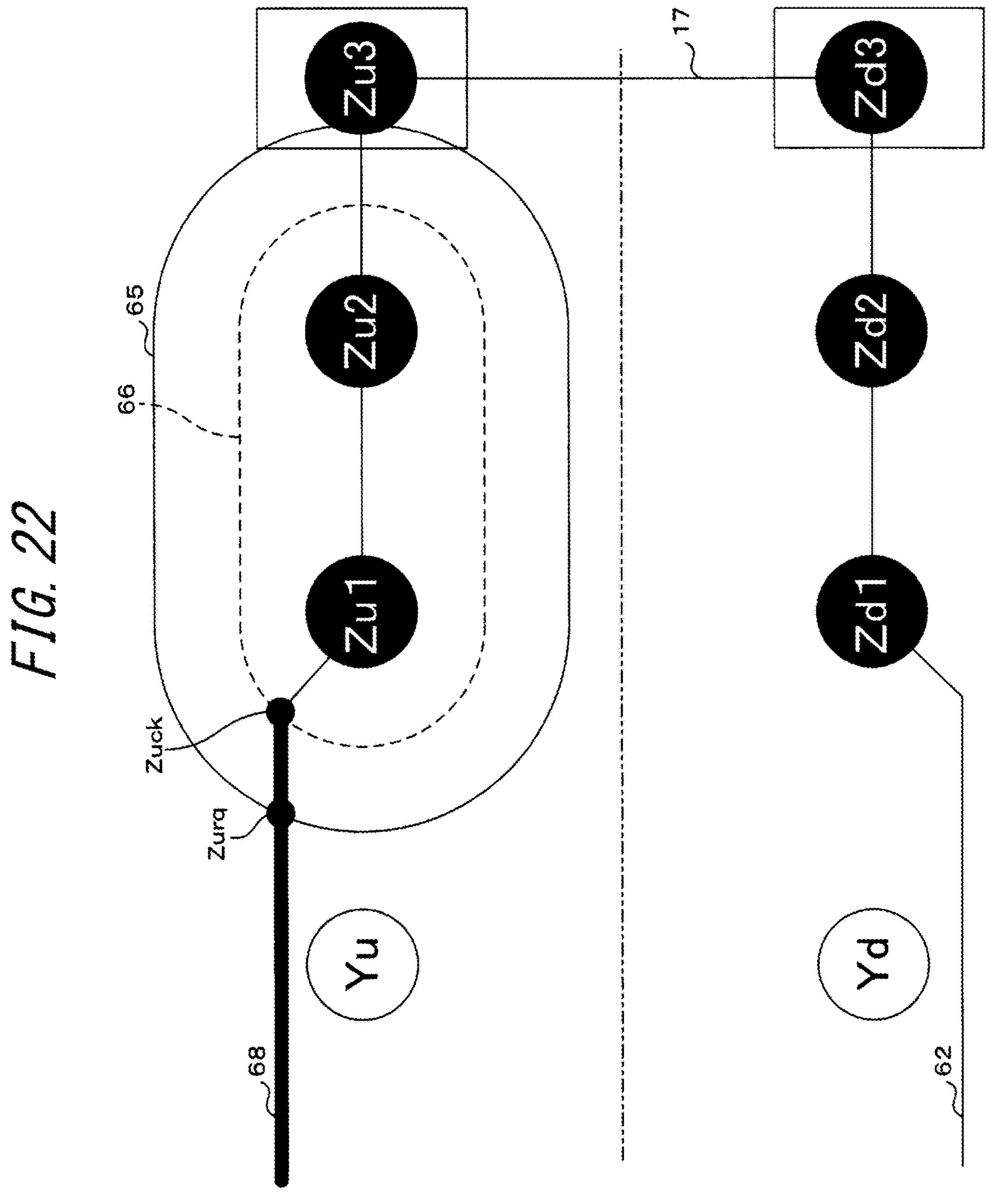
FIG. 22 is a diagram illustrating a partial route in the second embodiment.

FIGS. 22 through 25 illustrate a partial route 68 in the second embodiment. An example of operations of the mobile body 30 using the elevator 17 is described with reference to FIGS. 20 through 25. In FIG. 22, the partial route 68 just before reaching the elevator link is indicated by a bold line. Based on the request distance and confirmation distance set for the "EVu-1" link from node Zu1 to node Zu2, a transit pass request line 65 and a transit pass confirmation line 66 surrounding the link are defined.

In a case in which the mobile body 30 reaches point Zurq, which is the intersection of the second route 62 and the transit pass request line 65, the control unit 41 transmits an issuance request to the server 20 for transit passes related to travel after point Zuck. As explained with reference to FIG. 20, a different transit pass ID is set for each elevator link. In the case of travel on the second route 62 illustrated in FIG. 25, the control unit 41 transmits an issuance request to the server 20 for five transit passes for "EVu-1", "EVu-2", "EVu-5", "EVd-2", and "EVd-4".

In a case in which the mobile body 30 has not received the transit passes before reaching point Zuck, the control unit 41 does not indicate the route to be traveled after Zuck to the drive apparatus 36. The drive apparatus 36 stops the mobile body 30 at Zuck. The mobile body 30 remains stopped and waits until the transit passes are issued.

Figure 23:
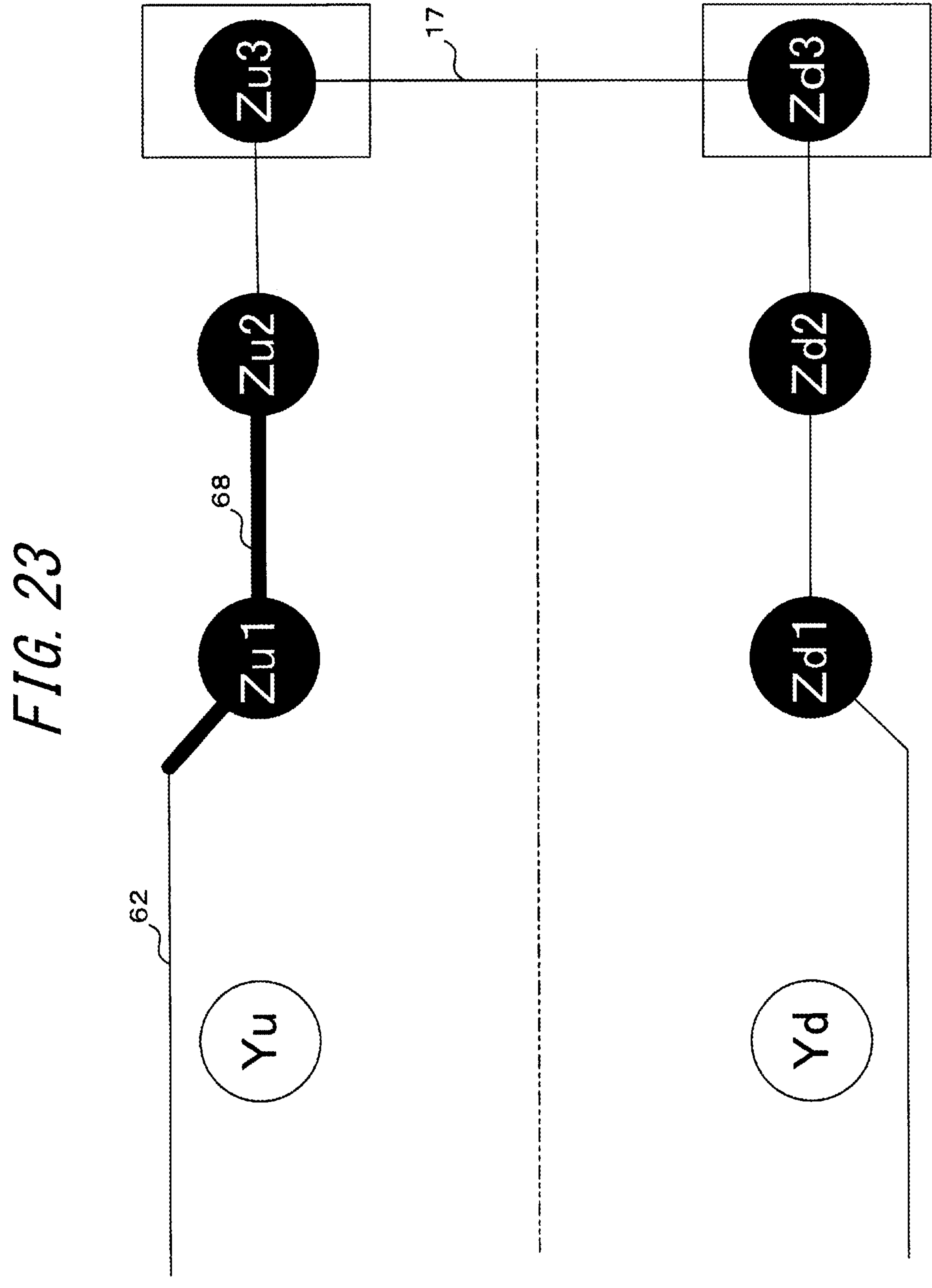
FIG. 23 is a diagram illustrating a partial route in the second embodiment.

In a case in which the transit passes are received, the control unit 41 instructs the drive apparatus 36 to travel the partial route 68 to node Zu2, as illustrated in FIG. 23. The drive apparatus 36 stops the mobile body 30 at node Zu2. The drive apparatus 36 turns the mobile body 30 around so that the back of the mobile body 30 faces the door of the elevator 17.

As described above, the control unit 41 determines the current position of the mobile body 30 when necessary and transmits the current position to the server 20. In a case in which the mobile body 30 reaches node Zu2 or comes within a predetermined distance from node Zu2, the control unit 21 transmits an instruction to an elevator control server, omitted from the drawings, to board the mobile body 30 at floor u and unload the mobile body 30 at floor d. The server 20 may also function as the elevator control server.

Figure 24:
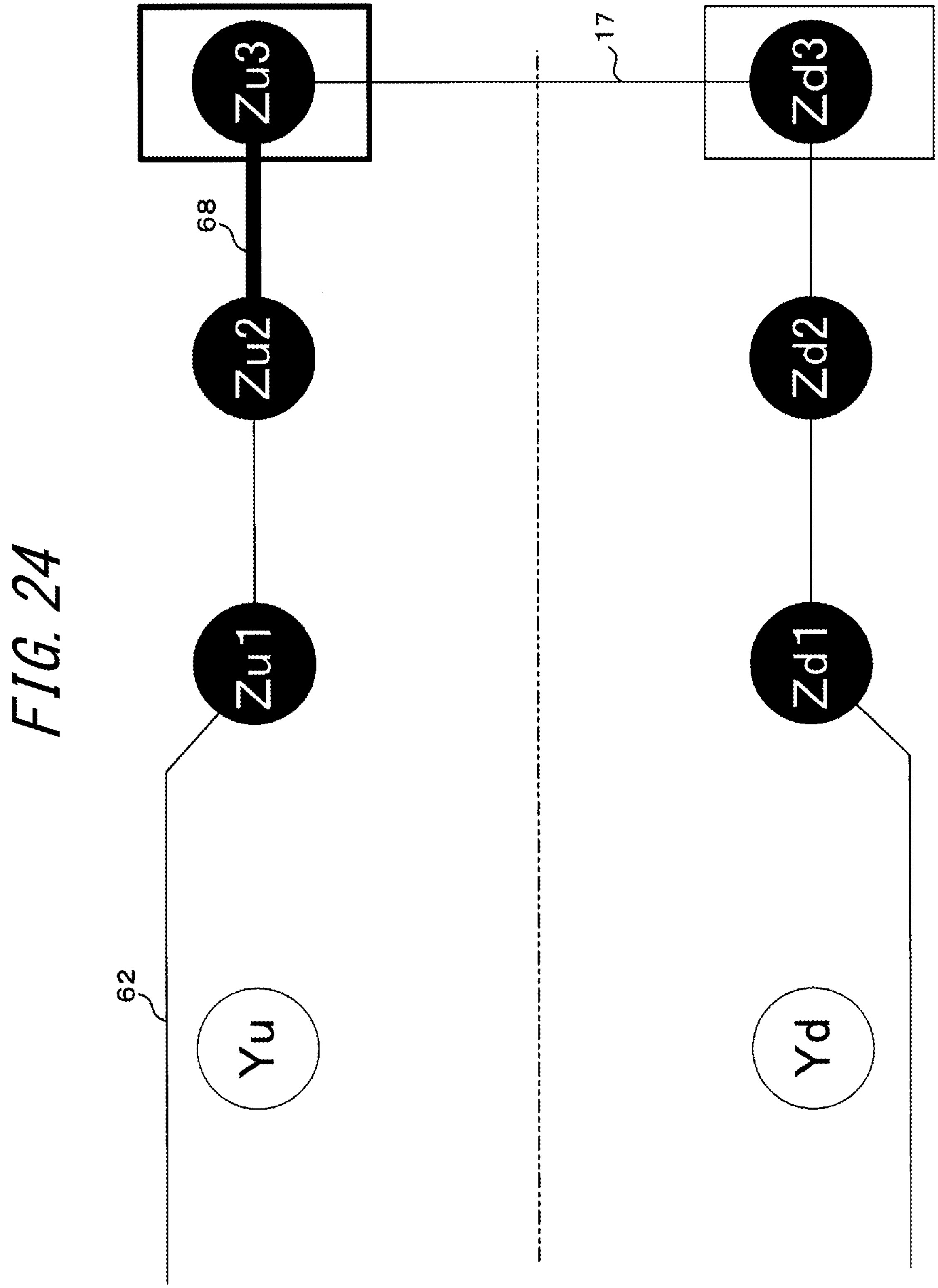
FIG. 24 is a diagram illustrating a partial route in the second embodiment.

The elevator control server moves the car of the elevator 17 to floor u and opens the door. In FIG. 24, the bold rectangle indicates the car that has arrived at floor u. As illustrated in FIG. 24, the control unit 41 instructs the drive apparatus 36 to travel facing backward on the partial route 68 to node Zu3. The drive apparatus 36 causes the mobile body 30 to travel facing backward and board the elevator 17. The elevator control server moves the car to floor d and opens the door.

Figure 25:
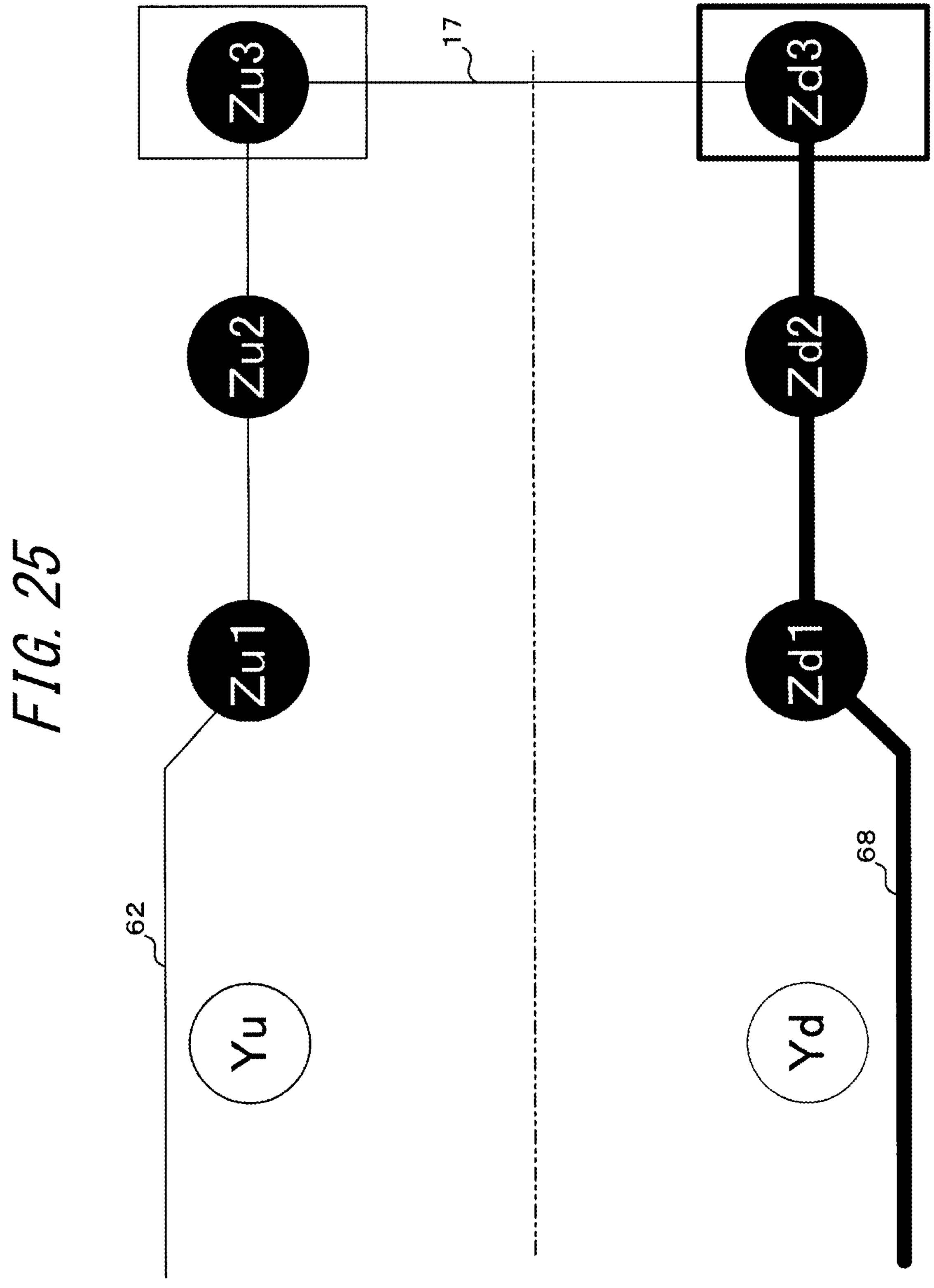
FIG. 25 is a diagram illustrating a partial route in the second embodiment.

During boarding of the elevator 17, the control unit 41 extracts the partial route 68 to the next location where a transit pass is required. The extracted partial route 68 is indicated in FIG. 25 by a bold line. After detecting the opening of the door via the sensor 34, the control unit 41 instructs the drive apparatus 36 to travel the partial route 68. The drive apparatus 36 causes the mobile body 30 to travel along the indicated partial route 68.

With this configuration, an information processing system 10 that uses the elevator 17 to move the mobile body 30 to other floors can be realized.

Figure 26:
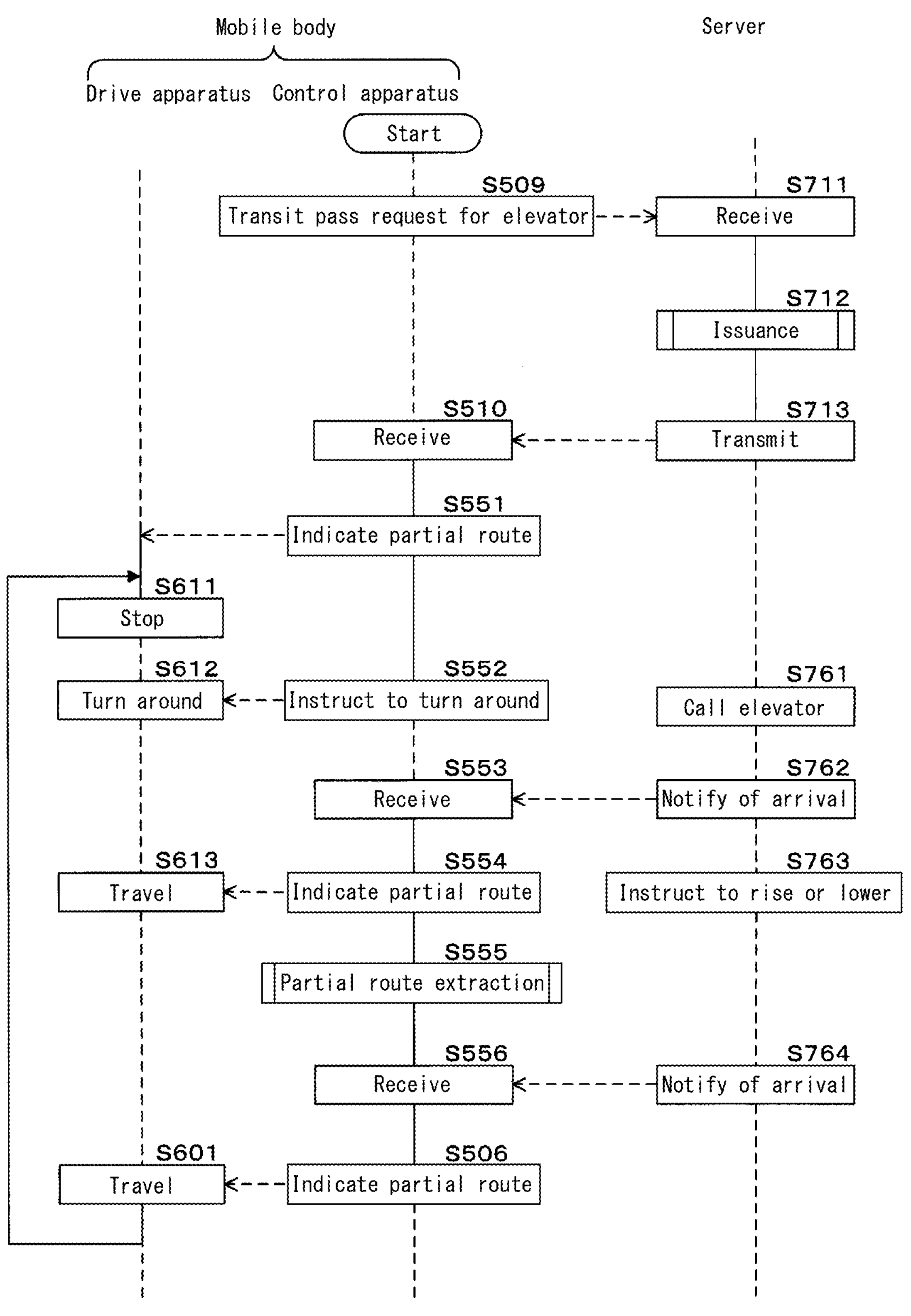
FIG. 26 is a flowchart illustrating the flow of processing by a program in the second embodiment.

FIG. 26 is a flowchart illustrating the flow of processing in a program of the second embodiment. FIG. 26 is used to describe the processing that occurs after the control unit 41 requests the transit passes required to use the elevator 17 in step S509 of the program of the first embodiment, which was described with reference to FIG. 13, until movement via the elevator 17 is completed and the processing returns to the program of the first embodiment.

The control unit 41 transmits an issuance request to the server 20 for transit passes including transit passes for the elevator links (step S509). In step S509, the mobile body 30 is passing through point Zurq described with reference to FIG. 22.

The control unit 21 receives the request for the transit passes (step S711). The control unit 21 calls a subroutine for issuance (step S712). The subroutine for issuance used in the second embodiment also determines whether there is interference with other mobile bodies 30 at the elevator links and issues the transit passes in a case in which there is no interference. The control unit 21 transmits the issued transit passes to the mobile body 30 (step S713).

The method of determining whether there is interference with a mobile body 30 at the elevator link depends on various conditions, such as whether the elevator 17 is for the exclusive use of mobile bodies 30, whether the elevator 17 is shared with pedestrians, how many mobile bodies 30 can board simultaneously, and so on. Illustration and explanation based on flowcharts are thus omitted.

The control unit 41 receives and temporarily stores the issued transit passes in the auxiliary storage apparatus 43 or the main storage apparatus 42 (step S510). The control unit 41 indicates the partial route 68 from point Zuck to node Zu1 to the drive apparatus 36 (step S551). If the mobile body 30 is traveling, the drive apparatus 36 continues travel to node Zu1 and stops. If the mobile body 30 is stopped at point Zuck, the drive apparatus 36 causes the mobile body 30 to travel to node Zu1 and stop (step S611).

After the mobile body 30 arrives at node Zu2, the control unit 41 instructs the drive apparatus 36 to turn around (step S552). The drive apparatus 36 turns the mobile body 30 around in accordance with the instruction from the control unit 41 (step S612).

The partial route 68 that the control unit 41 indicates in step S551 may include an instruction to turn around at the end point. In such a case, step S552 is not necessary, and the drive apparatus 36 transitions to step S612 to turn the mobile body 30 around after the end of step S611.

After the mobile body 30 arrives at Zu2 or approaches within a predetermined range from Zu2, the control unit 21 transmits a call request for the elevator 17 to the elevator control server, omitted from the drawings (step S761). The call request for the elevator 17 includes information on the floor on which the mobile body 30 is to board the elevator 17 and the floor on which the mobile body 30 is to exit.

The control unit 21 acquires a car arrival notification, i.e., a notification indicating that the mobile body 30 can enter the car, from the elevator control server and transmits the arrival notification to the control unit 41 (step S762). The control unit 41 receives the arrival notification (step S553). The control unit 41 indicates the partial route 68 from node Zu2 to node Zu3, i.e., the partial route 68 to enter the car facing backward, to the drive apparatus 36 (step S554). The drive apparatus 36 controls the tires 37 to travel to node Zu3 and stop (step S613).

The control unit 41 calls a subroutine for partial route extraction (step S555). The subroutine for partial route extraction is identical to the subroutine in the first embodiment described with reference to FIG. 14. In step S555, the control unit 41 acquires the partial route 68 to travel after exiting the elevator 17 and information about the transit passes required to proceed from the partial route 68 to the next route.

After the mobile body 30 arrives at Zu3, the control unit 21 transmits an instruction to the elevator control server to rise or descend to the destination floor (step S763). The elevator control server moves the car to floor u, opens the door, and notifies the control unit 21. The control unit 21 notifies the mobile body 30 of arrival at the destination floor (step S764).

The control unit 41 receives the notification (step S556). The control unit 41 indicates the partial route 68 from node Zd3 onward to the drive apparatus 36 (step S506). The drive apparatus 36 controls the tires 37 for the mobile body 30 to travel on the partial route 68 (step S601). The process from step S506 and step S601 onward is identical to the flow of the program in the first embodiment described with reference to FIG. 13.

The elevator control server may detect that the mobile body 30 has arrived near node Zu2 by a sensor or the like arranged in the elevator hall. In such a case, the control unit 21 does not need to execute step S761, and the elevator control server operates the elevator 17 autonomously.

The elevator control server may detect that the mobile body 30 has boarded the elevator 17 using, for example, a weight sensor or a human sensor installed in the car. In such a case, the control unit 21 does not need to execute step S763, and the elevator control server operates the elevator 17 autonomously.

The control unit 41 may use the sensor 34 to detect that the door of the elevator 17 has opened and that the car can be entered. In such a case, the control unit 21 need not execute steps S762 and S764. The control unit 41 detects that the door of the elevator 17 has opened and executes steps S554 and S506.

At the stage when the mobile body 30 reaches node Zu2, the control unit 41 may accept an instruction via the controller 32 as to whether the user will operate the elevator call button. The user does not operate the elevator call button in a case in which the elevator call button has already been operated by a prior user. The user may ask a person near the elevator call button to operate the elevator call button.

In a case in which it is necessary to operate the elevator call button, the user indicates that he or she will perform the operation. Using information from the sensor 34, such as a camera, the control unit 41 instructs the drive apparatus 36 to move the mobile body 30 to a position where the user can operate the elevator call button. The user presses the elevator call button himself/herself. It is possible to realize an information processing system 10 that uses an existing elevator 17 as is.

The elevator 17 may be a so-called "through-type" elevator with doors at two locations, at the front and back. When using a through-type elevator 17, the mobile body 30 enters and exits the car by moving forward.

According to the present embodiment, an information processing system 10 that uses the elevator 17 to move the mobile body 30 to other floors can be provided.

Third Embodiment

The present embodiment relates to an information processing system 10 that records the position of a node using the mobile body 30. A description of parts in common with the first embodiment is omitted.

As described above, map data 51 is formed by a plurality of nodes and links connecting two nodes. The mobile body 30 travels to its destination based on the coordinates of each node recorded in the node DB 52.

For example, at a location where a new information processing system 10 is to be installed, map data 51 can be generated based on a layout plan of various obstacles 71 such as walls, columns, and shops. However, due to errors during construction, design changes, and the like, discrepancies may arise between the map data 51 generated on paper and the actual situation at the site. At event venues and the like where numerous temporary tents and the like are placed in a plaza, a layout plan with sufficient accuracy may not be created, preventing generation of the map data 51 on paper.

Even during operation of the information processing system 10, it may be necessary to modify existing map data 51 due to various circumstances, such as changes in the arrangement of obstacles 71 and changes in the flow of people. In the present embodiment, an information processing system 10 that can easily generate and modify map data 51 is provided.

In the present embodiment, the modification of the map data 51 is performed by two persons: a first operator who is in charge of operating the mobile body 30 on-site, and a second operator who is in charge of generating or modifying the map data 51 in an office or other location.

The first operator moves the mobile body 30 to the position where a node is to be placed. For example, the first operator boards the mobile body 30 and sets node U as the destination. The control unit 41 causes the mobile body 30 to travel to node U. The first operator moves the mobile body 30 manually to the position where node U is actually to be placed.

The first operator operates the controller 32 to instruct the control unit 41 to transmit positional information. The control unit 41 determines the current position of the mobile body 30 using the sensor 34 or the like and transmits the current position to the server 20.

Figure 27:
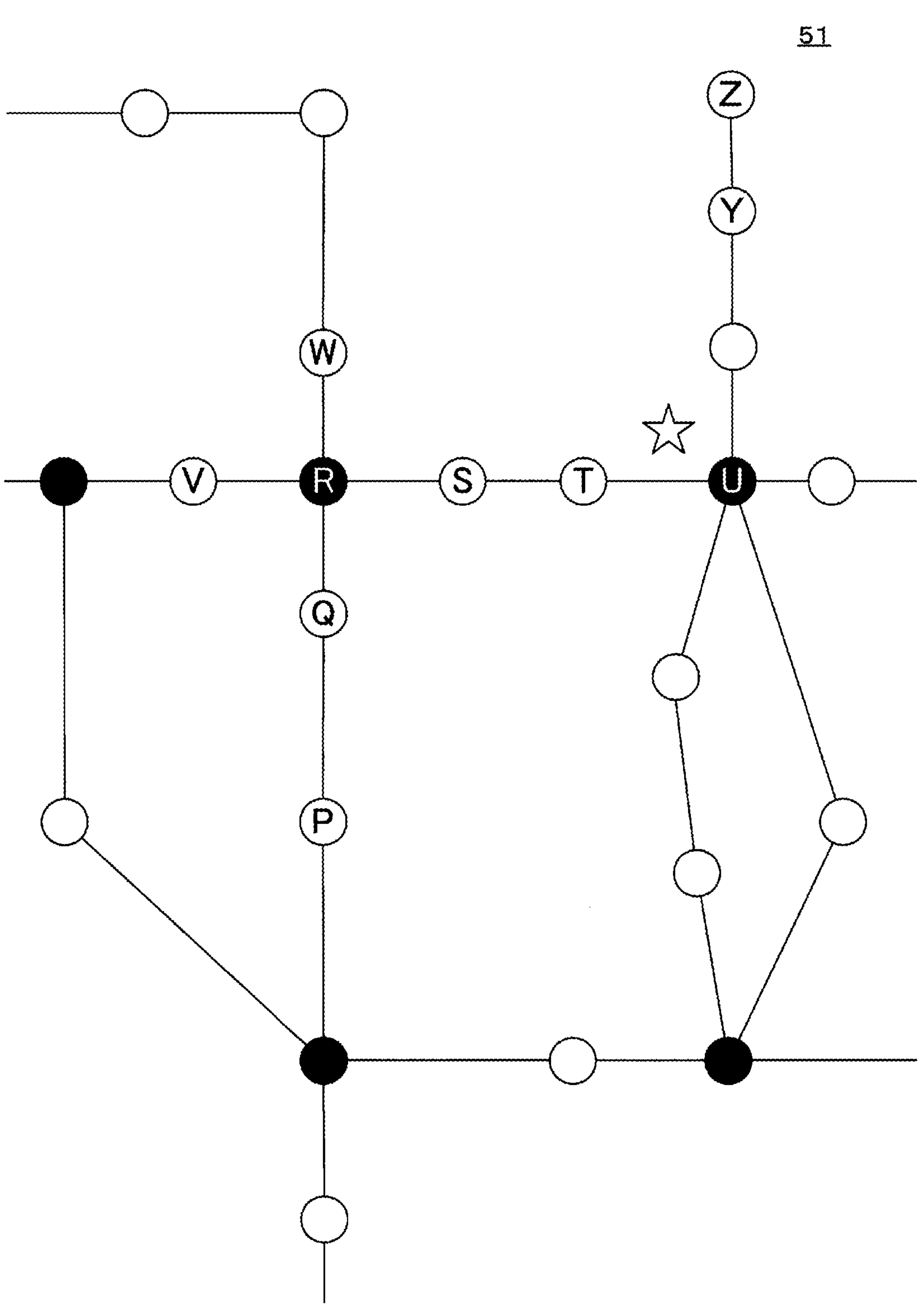
FIG. 27 is an example of a map screen viewed by a second operator.

FIG. 27 is an example of a map screen viewed by the second operator. FIG. 27 illustrates an example for the case of existing map data 51. The positional information transmitted from the mobile body 30 is displayed in a superimposed manner as a star on the existing map data 51. Along with the map data 51, an image of the area around the mobile body 30, the arrangement of the obstacles 71, and the like may also be displayed.

In a case in which there is no existing map data 51 and new map data 51 is to be generated, the map data 51 is not displayed in a superimposed manner.

An example of generating a new node is now described. The second operator considers whether to generate a new node at the position of the star. When deciding to generate the new node, the second operator double-clicks the star, for example. The control unit 21 adds a new record to the node DB 52 and records the coordinates corresponding to the position of the star. The control unit 21 assigns a node ID to the added node.

An example of modifying the position of an existing node is now described. The second operator considers whether, for example, it is appropriate to change node U to the position indicated by the star. In a case in which it is appropriate, the second operator drags and drops the mark indicating node U onto the star.

Figure 28:
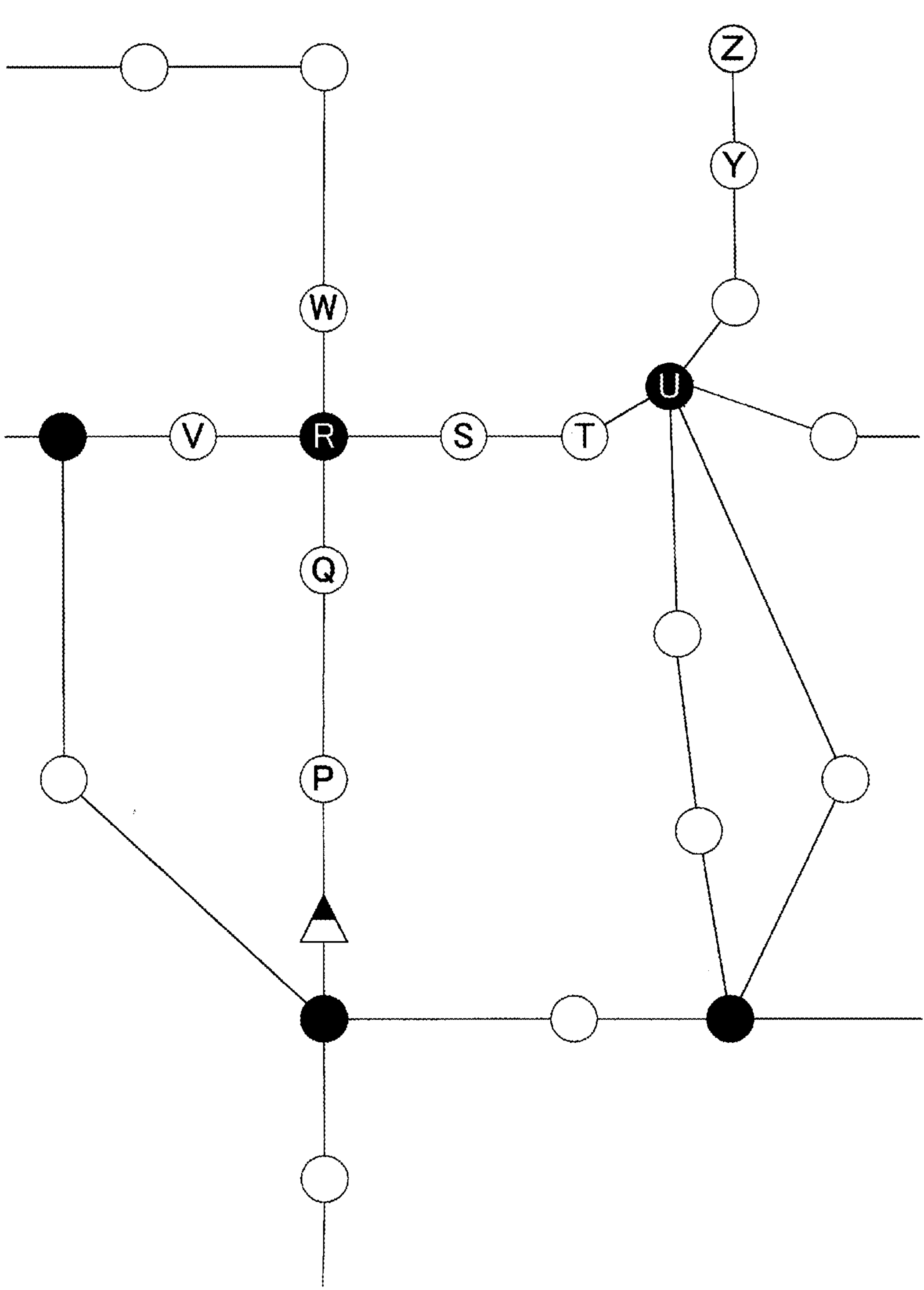
FIG. 28 is an example of the map screen displayed after a drag-and-drop operation.

FIG. 28 is an example of the map screen displayed after the drag-and-drop operation. The position of node U has been changed, and the end points of the links connected to node U have been changed to the new node U position.

Figure 29:
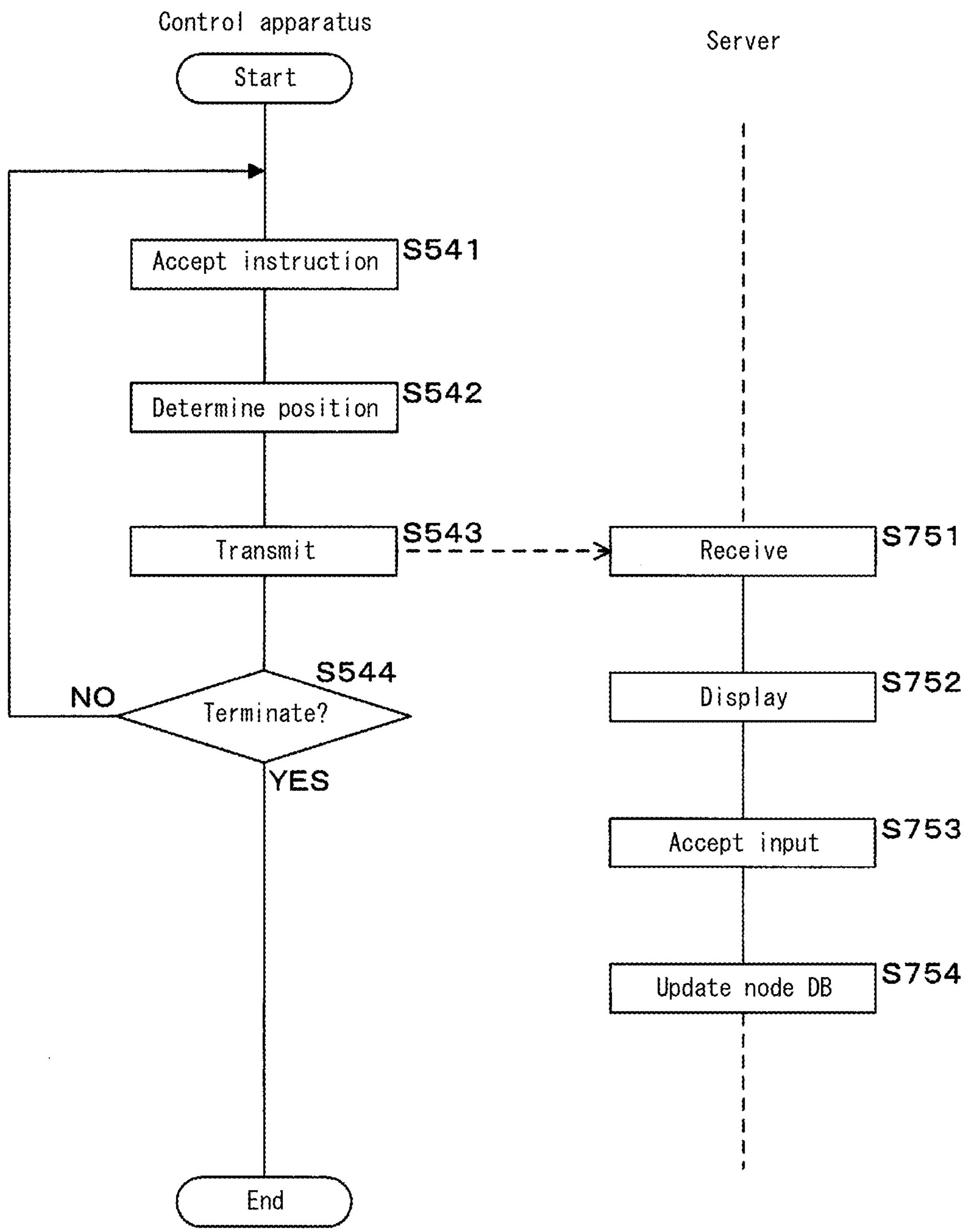
FIG. 29 is a flowchart illustrating the flow of processing by a program in a third embodiment.

FIG. 29 is a flowchart illustrating the flow of processing in a program of the third embodiment. In the flowchart in FIG. 29, the process of causing the mobile body 30 to travel autonomously based on instructions by the first operator is omitted.

The control unit 41 accepts an instruction by the first operator regarding the transmission of positional information (step S541). The control unit 41 determines the current position of the mobile body 30 (step S542). The control unit 41 transmits the current position of the mobile body 30 to the server 20 (step S543). The control unit 41 may transmit information acquired by the sensor 34 regarding images of the surroundings of the mobile body 30, the arrangement of obstacles 71, and the like, along with the current position. The control unit 41 may transmit additional information such as comments by the first operator along with the current position.

The control unit 41 determines whether to terminate the process (step S544). For example, if the first operator indicates that the work is finished, the control unit 41 determines to terminate the process. In a case of determining not to terminate the process (NO in step S544), the control unit 41 returns to step S541. In a case of determining to terminate the process (YES in step S544), the control unit 41 terminates the process.

The control unit 21 receives the current position of the mobile body 30 from the control apparatus 40 (step S751). The control unit 21 superimposes a marker indicating the current position of the mobile body 30 on the map data 51 as described with reference to FIG. 27 and displays the result on a display apparatus, omitted from the drawings (step S752).

The control unit 21 accepts input by the second operator via an input apparatus, omitted from the drawings (step S753). The second operator indicates that a new node is to be created at the position of the marker by double-clicking on the marker, for example, or that an existing node is to be changed to the position of the marker by dragging and dropping an existing node onto the marker.

The control unit 21 updates the map data 51 based on operation by the second operator (step S754). Specifically, when the second operator provides an instruction to create a new node, the control unit 41 adds a new record to the node DB 52. The control unit 41 records the coordinates received in step S751 in the x-coordinate field and y-coordinate field of the added record. The control unit 41 assigns a unique node ID to the node ID field of the added record.

In a case in which the second operator provides an instruction to modify the node position, the control unit 21 searches the node DB 52 to extract the record related to the node that the second operator instructed to be modified. The control unit 41 records the coordinates received in step S751 in the x-coordinate field and y-coordinate field of the extracted record.

According to the present embodiment, the position of a node can be properly modified without surveying or other such work. Since the work is divided between the first operator who moves the mobile body 30 to the desired position and the second operator who updates the map data 51, the second operator can update the map data 51 while working from home, at a remote office, or the like.

The second operator may add a new node to the node DB 52 using the coordinate data received in step S751. In the case of adding a new node, the second operator also adds the links connected to the node to the link DB 53.

As described above, the control unit 41 determines the current position of the mobile body 30 when necessary and transmits the current position to the server 20. When the first operator and second operator work simultaneously, the control unit 21 may display a marker indicating the current position of the mobile body 30 in the map data 51 instead of executing the program described with reference to FIG. 29.

The first operator contacts the second operator by phone, chat, or the like after moving the mobile body 30 to a predetermined position. The second operator may, for example, select an "add" button to indicate that a new node is to be created at the position of the marker, and may drag and drop an existing node onto the marker to indicate that the position of the existing node is to be changed to the position of the marker. The control unit 21 updates the node DB 52 based on the instruction from the second operator. This configuration further simplifies the work performed by the first operator.

Fourth Embodiment

The fourth embodiment relates to an information processing system 10 that enables a mobile body 30 to smoothly avoid obstacles 71. A description of parts in common with the first embodiment is omitted. FIG. 30 is a diagram illustrating the record layout of a link DB 53 in the fourth embodiment.

The link DB 53 in the present embodiment has an avoidance condition field in addition to each field of the link DB 53 in the first embodiment described with reference to FIG. 5. The avoidance condition field has a permission field, a left side width field, and a right side width field.

The permission field records whether permission is granted for an avoidance maneuver whereby the mobile body 30 avoids an obstacle 71 autonomously when such an obstacle 71 is present. "Yes" means that avoidance maneuver is permitted, and "no" means that the avoidance maneuver is not permitted.

The left side width field records the width by which the mobile body 30 is permitted to depart to the left from the second route 62 while avoiding the obstacle 71. The right side width field records the width by which the mobile body 30 is permitted to depart to the right from the second route 62 while avoiding the obstacle 71. When "no" is recorded in the permission field, "-" is recorded in the left side width field and the right side width field to indicate that no width is defined.

For example, in the elevator links described in the second embodiment, "no" is recorded in the permission field. "No" is also recorded in the permission field at locations where users, surrounding pedestrians, or the like are likely to feel in danger if the mobile body 30 suddenly changes direction to avoid an obstacle 71, such as near stairs, near a glass wall, near a moving walkway, or near an information desk.

Figure 31:
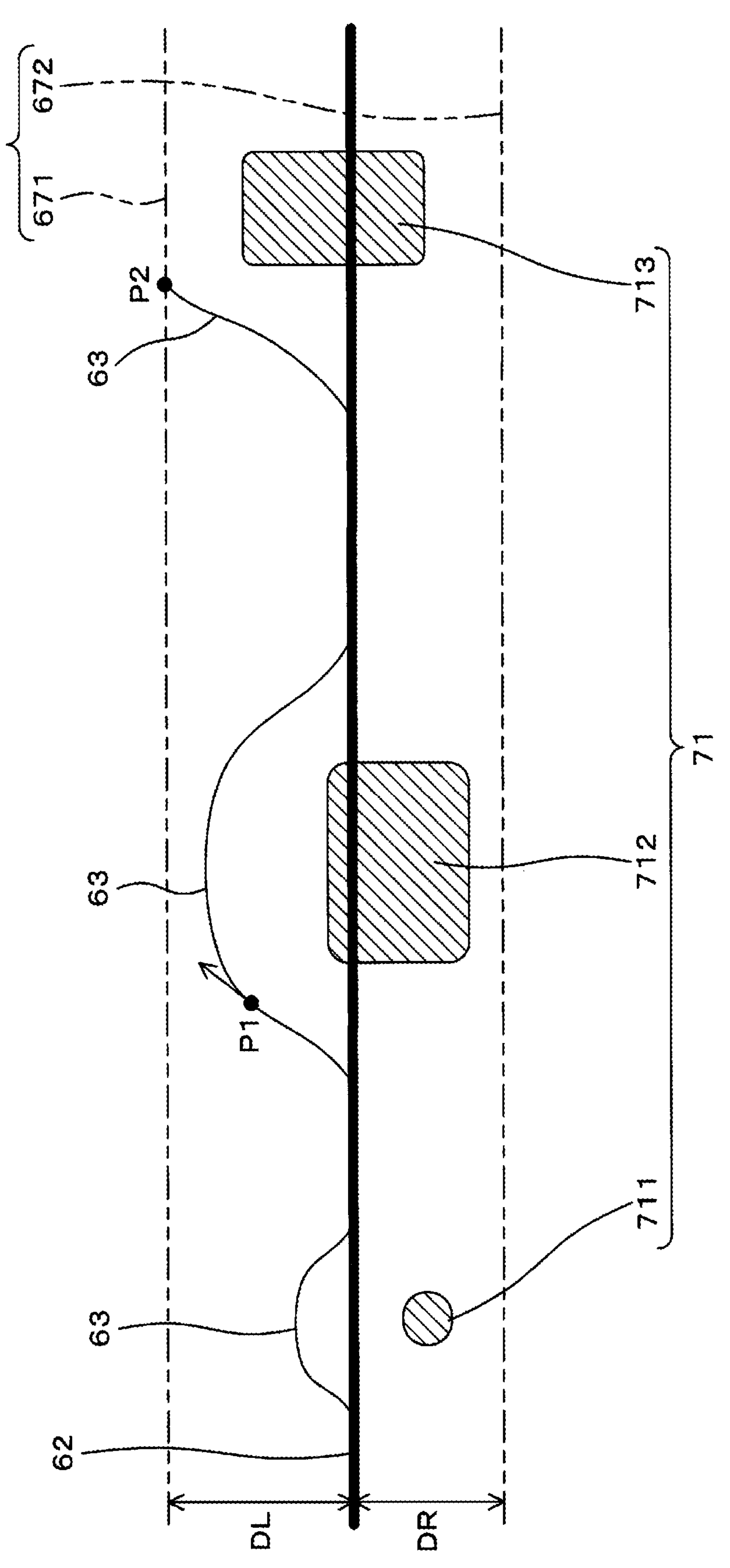
FIG. 31 is a diagram illustrating a travel route during an avoidance maneuver.

FIG. 31 is a diagram illustrating a travel route during an avoidance maneuver. An overview of the behavior of the mobile body 30 when obstacles 71 are present is described with reference to FIG. 31. In FIG. 31, the second route 62 that the mobile body 30 plans to travel is indicated as a horizontal straight line. The mobile body 30 passes from the left side to the right side of FIG. 31.

A left side avoidance boundary line 671 is disposed at a position that is a left side width DL away from the second route 62 to the left with respect to the direction of travel of the mobile body 30. A right side avoidance boundary line 672 is disposed at a position that is a right side width DR away from the second route 62 to the right with respect to the direction of travel of the mobile body 30. The left side avoidance boundary line 671 and the right side avoidance boundary line 672 are not physically real lines, but rather virtual lines used for processing within the control unit 41. When it is not necessary to specifically distinguish between left and right in the following description, both the left side avoidance boundary line 671 and the right side avoidance boundary line 672 may simply be described as an avoidance boundary line 67.

A first obstacle 711, a second obstacle 712, and a third obstacle 713 may come into contact with the mobile body 30 or the user on board. In the following description, the first obstacle 711, the second obstacle 712, and the third obstacle 713 may simply be described as the obstacle 71 when it is not necessary to distinguish between them. The obstacles 71 illustrated in FIG. 31 are, for example, baggage placed on the floor, a dropped object, another mobile body 30, a passerby, a cart, or the like which temporarily obstruct the travel of the mobile body 30.

In FIG. 31, a detour route 63 is illustrated as a thin line when the mobile body 30 travels around the obstacle 71. The second route 62 and the detour route 63 illustrate the route over which the front center of the mobile body 30 moves. The second route 62 and the detour route 63 are the approximate centerline of the area through which the mobile body 30 passes.

While traveling along the first route 61, the control unit 41 constantly determines whether a condition for starting an avoidance maneuver has been satisfied. Specifically, when both of the following two conditions are met, the control unit 41 determines that the condition for starting the avoidance maneuver has been satisfied.

(A) An obstacle 71 that blocks travel is present.

(B) A predetermined avoidance unauthorized time has elapsed since completion of the previous avoidance maneuver.

Regarding (A), the control unit 41 uses data acquired from the sensor 34 to determine the presence of an obstacle 71 that blocks travel. Regarding (B), the avoidance unauthorized time is, for example, 30 seconds. In the following description, the two conditions (A) and (B) above are described together as the avoidance start condition.

In a case in which (A) is satisfied, but (B) is not, the drive apparatus 36 autonomously stops the mobile body 30 before colliding with the obstacle 71. The control unit 41 may instruct the drive apparatus 36 to stop traveling just before the obstacle 71.

In a case in which the avoidance start condition is met, the control unit 41 determines whether the link on which the avoidance maneuver is permitted is being traveled. Specifically, the control unit 41 extracts a record from the link DB 53, using the link ID of the link being traveled as a key, and obtains the data in the permission field.

In a case in which "no" is recorded in the permission field, i.e., the mobile body 30 is traveling on a link at which an avoidance maneuver is not permitted, the control unit 41 stops the mobile body 30 just before the obstacle 71. When the sensor 34 detects that the obstacle 71 is no longer present, the control unit 41 resumes travel of the mobile body 30.

For example, in a case in which the obstacle 71 continues to be present for several minutes, the control unit 41 may transmit a notification to a support staff member or the like who assists in the safe travel of the mobile body 30. The support staff member removes the obstacle 71 or manually operates the mobile body 30 to allow the mobile body 30 to pass safely, for example.

In a case in which "yes" is recorded in the permission field, i.e., the mobile body 30 is traveling on a link at which an avoidance maneuver is permitted, the control unit 41 causes the mobile body 30 to travel the detour route 63 based on a known collision avoidance algorithm. Any algorithm can be used for the collision avoidance algorithm, such as a Vector Field Histogram (VFH) method or Dynamic Window Approach (DWA) method. Since collision avoidance algorithms are well known, the details are omitted.

The detour route 63 for avoiding a relatively small first obstacle 711 is now described. In accordance with a known collision avoidance algorithm, the control unit 41 performs control to travel the detour route 63, which passes slightly to the left of the second route 62 that was originally planned to be traveled, and then promptly return to the second route 62.

The detour route 63 for avoiding a medium-sized second obstacle 712 is now described. In accordance with a known collision avoidance algorithm, the control unit 41 performs control to travel the detour route 63, which makes a larger turn to the left than the second route 62 that was originally planned to be traveled. For example, when the front center of the mobile body 30 reaches the position indicated by P1, the mobile body 30 is facing approximately 45 degrees to the left and forward with respect to the second route 62 as indicated by the arrow.

Therefore, there is no obstacle 71 in front of the mobile body 30. If the control unit 41 were to determine that the avoidance of the second obstacle 712 is complete and change the direction of the mobile body 30 back to the second route 62, the obstacle 71 would be present in front of the mobile body 30. The control unit 41 therefore again starts avoiding the second obstacle 712 according to a known avoidance algorithm.

The mobile body 30 repeatedly changes direction, making the ride very uncomfortable for the user. This is also dangerous for pedestrians passing near the mobile body 30, as it is difficult to tell which direction the mobile body 30 is heading. Furthermore, the mobile body 30 slows down as it repeatedly changes directions in the same location, which hinders traffic.

To avoid the above problems in the information processing system 10 of the present embodiment, travel according to an avoidance algorithm is continued once the avoidance algorithm is started, until a predetermined avoidance maneuver time elapses. The avoidance maneuver time is, for example, 5 seconds.

In a case in which no obstacle 71 is present in front of the mobile body 30 after the avoidance maneuver time has elapsed, the control unit 41 changes the direction of the mobile body 30 to a direction for returning to the second route 62. If the obstacle 71 is still present in front of the mobile body 30 after the avoidance maneuver time has elapsed, the control unit 41 continues the avoidance maneuver until the avoidance maneuver time elapses again. With this configuration, it is possible to provide an information processing system 10 in which the mobile body 30 smoothly avoids the obstacle 71 without repeatedly changing direction.

However, in a case in which the avoidance maneuver is continued for an extended period of time, the mobile body 30 may move too far away from the second route 62. In such a case, it becomes difficult for the control unit 41 to determine an appropriate route back to the second route 62. For example, a problem could occur in which the avoidance maneuver causes the mobile body 30 to enter a pedestrian-only area or the like where travel was not scheduled. A mechanism for avoiding such problems is now described using the case of avoiding a large-sized third obstacle 713 as an example.

In accordance with a known collision avoidance algorithm, the control unit 41 performs control to travel the detour route 63, which makes a larger turn to the left than the second route 62 that was originally planned to be traveled. As indicated by P2, once the front center of the mobile body 30 reaches the left side avoidance boundary line 671, the control unit 41 stops the travel of the mobile body 30. In a case in which the sensor 34 detects that the obstacle 71 is no longer present, the control unit 41 resumes the travel of the mobile body 30 and returns to the second route 62.

By defining the left side avoidance boundary line 671 and the right side avoidance boundary line 672 on the left and right sides of the second route 62 to limit the range of the avoidance maneuver by the mobile body 30, it is possible to provide an information processing system 10 that prevents the mobile body 30 from entering the wrong location.

Figure 32:
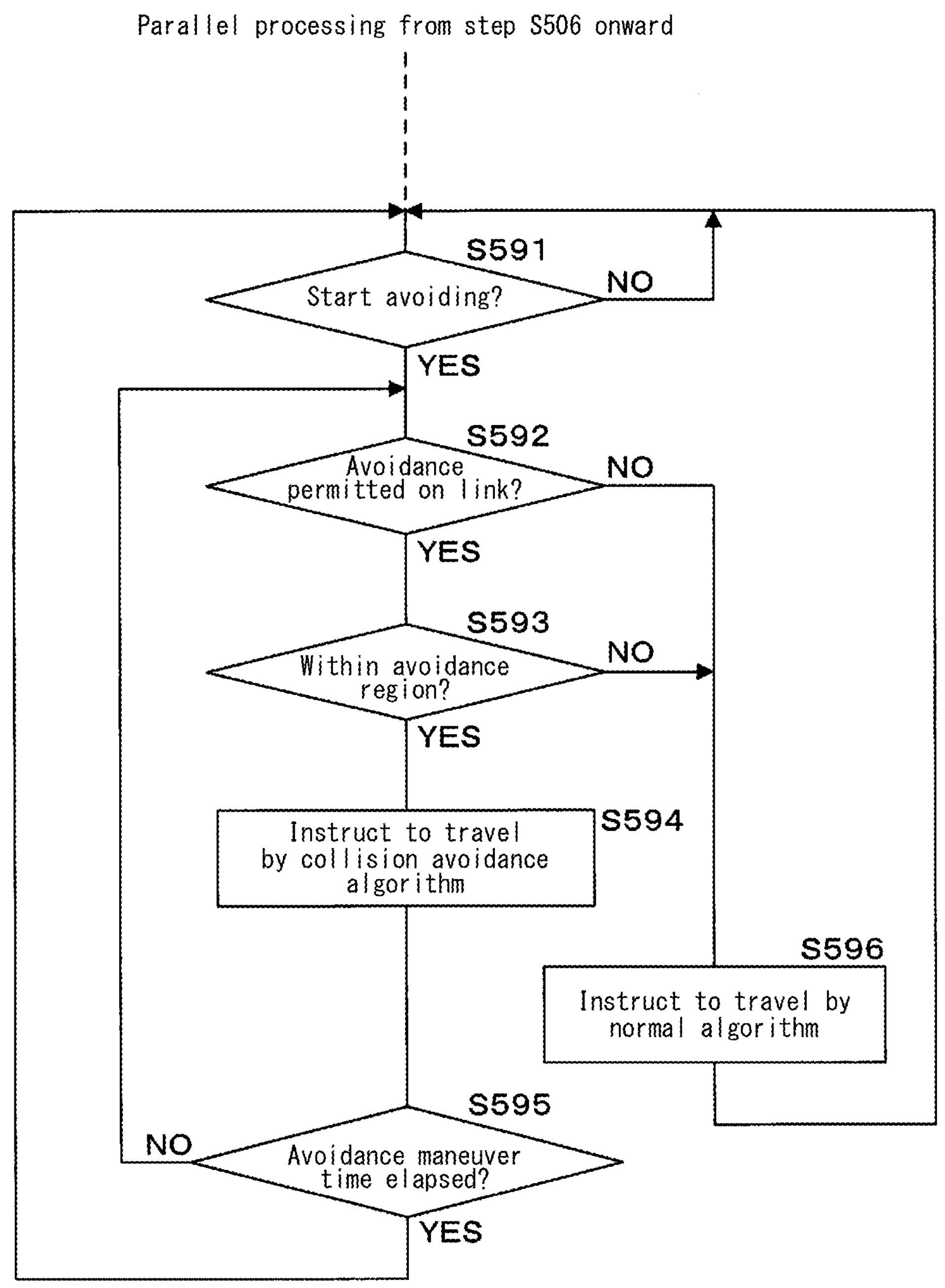
FIG. 32 is a flowchart illustrating the flow of processing by a program in the fourth embodiment.

FIG. 32 is a flowchart illustrating the flow of processing in a program of the fourth embodiment. The program in FIG. 32 is executed by the control unit 41 in parallel with step S507 onward, after the control unit 41 indicates the partial route 68 to the drive apparatus 36 in step S506 of the program in the first embodiment described with reference to FIG. 13.

The control unit 41 determines whether the aforementioned avoidance start condition is satisfied (step S591). In a case in which it is determined that the avoidance start condition is not satisfied (NO in step S591), the control unit 41 repeats step S591. While the control unit 41 repeats step S591, the drive apparatus 36 continues to travel the partial route 68 indicated in step S506. In a case in which an obstacle 71 is detected, the drive apparatus 36 stops the mobile body 30 just before the obstacle 71. In a case in which the obstacle 71 is no longer present, the drive apparatus 36 resumes traveling the partial route 68.

In a case in which it is determined that the avoidance start condition is satisfied (YES in step S591), the control unit 41 determines whether the link being traveled is a link on which an avoidance maneuver is permitted (step S592). Specifically, the control unit 41 extracts a record from the link DB 53, using the link ID of the link being traveled as a key, and obtains the data in the permission field. In a case in which "yes" is recorded in the permission field, the control unit 41 determines that an avoidance maneuver is permitted on the link being traveled.

In a case in which it is determined that an avoidance maneuver is permitted on the link being traveled (YES in step S592), the control unit 41 determines whether the current position of the mobile body 30 is within an avoidance area, i.e., between the left side avoidance boundary line 671 and the right side avoidance boundary line 672 (step S593).

In a case in which it is determined that the current position is within the avoidance area (YES in step S593), the control unit 41 instructs the drive apparatus 36 to perform an avoidance maneuver based on a known collision avoidance algorithm (step S594). During the avoidance maneuver, the control unit 41 calculates, when necessary, the direction and speed in which the mobile body 30 is to travel based on the surrounding conditions acquired from the sensor 34 and provides instructions to the drive apparatus 36. The drive apparatus 36 controls the tires 37 to make the mobile body 30 perform the avoidance maneuver.

The control unit 41 determines whether the predetermined avoidance maneuver time has elapsed since the start of the avoidance maneuver (step S595). As described above, the avoidance maneuver time is, for example, 5 seconds. The avoidance maneuver time may be determined based on the average speed of the mobile body 30 during the avoidance maneuver. For example, if the average speed is high, the avoidance maneuver time is set to be longer, and if the average speed is low, the avoidance maneuver time is set to be shorter.

In a case in which it is determined that the avoidance maneuver time has not elapsed (NO in step S595), the control unit 41 returns to step S592. In a case in which it is determined that the avoidance maneuver time has elapsed (YES in step S595), the control unit 41 returns to step S591.

In a case in which it is determined that an avoidance maneuver is not permitted on the link being traveled (NO in step S592), or the current position is not within the avoidance area (NO in step S593), the control unit 41 instructs the drive apparatus 36 to travel according to the normal algorithm, i.e., to return to traveling on the first route 61 indicated in step S506 (step S596). The control unit 41 returns to step S591.

In a case in which step S596 is reached without going through step S594 after determining in step S591 that the avoidance start condition is met, the control unit 41 does not need to give instructions to the drive apparatus 36 in step S596. The control unit 41 returns to step S591 without executing step S596.

The drive apparatus 36 accepts the instruction in step S593 and returns to traveling on the first route 61. If the current position of the mobile body 30 is away from the first route 61 due to an avoidance maneuver, the drive apparatus 36 travels the route that returns the mobile body 30 to the first route 61 over the shortest distance, for example. In step S596, the control unit 41 may instruct the drive apparatus 36 to travel the route that returns the mobile body 30 to the first route 61 over the shortest distance.

According to the present embodiment, it is possible to provide an information processing system 10 in which the mobile body 30 smoothly avoids an obstacle 71 encountered while traveling. Since frequent direction changes are avoided during the avoidance maneuver, the information processing system 10 can be comfortably used by the user. The possibility of an avoidance maneuver and the avoidance area are determined for each link ID, enabling provision of an information processing system 10 in which the mobile body 30 performs an avoidance maneuver only at locations where the avoidance maneuver can be performed safely.

Fifth Embodiment

The fifth embodiment relates to an information processing system 10 that determines the position to request a transit pass and the position to return a transit pass based on the distance along the second route 62. A description of parts in common with the first embodiment is omitted.

Figure 33:
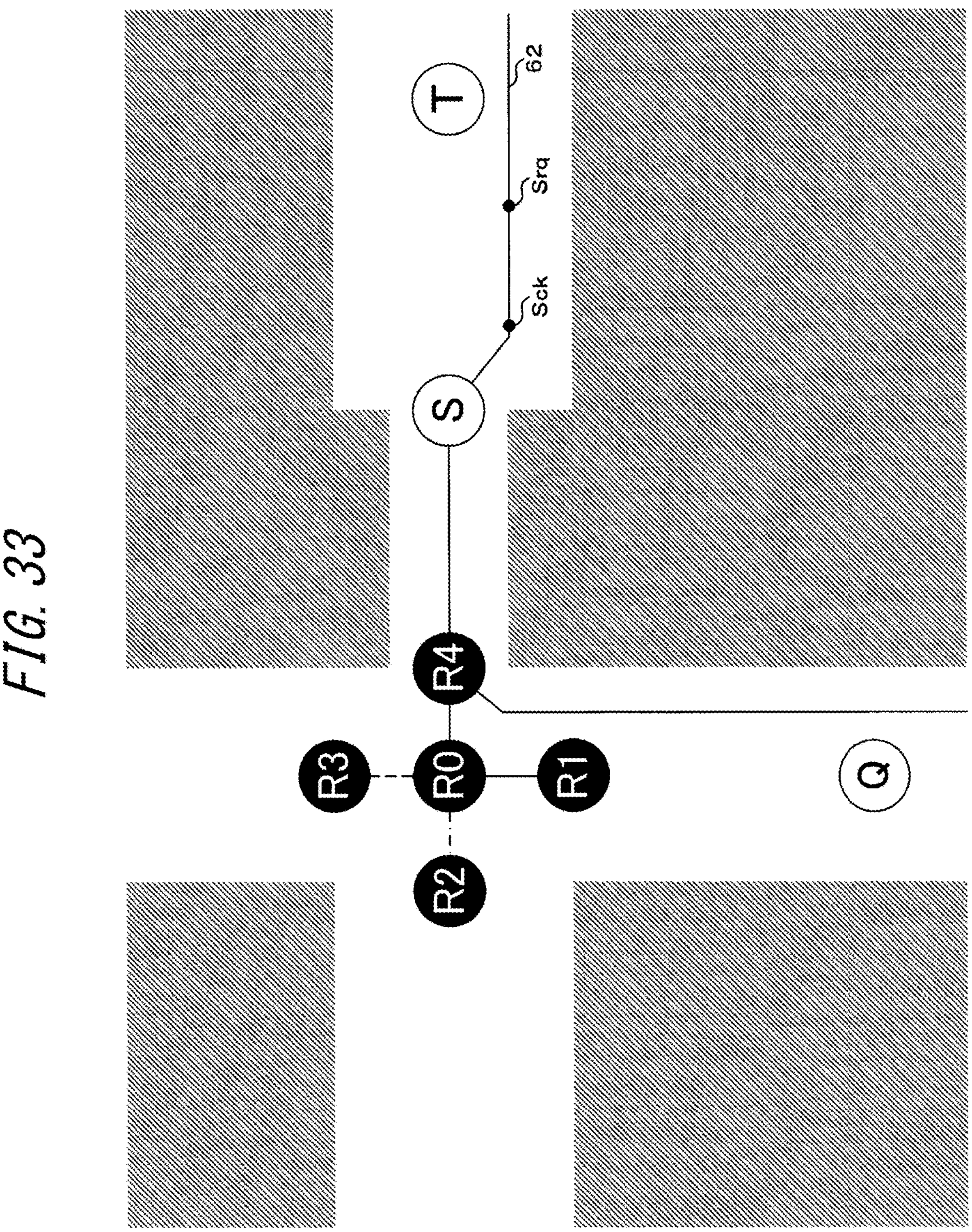
FIG. 33 is a diagram illustrating transit passes in a fifth embodiment.

FIG. 33 is a diagram illustrating transit passes in the fifth embodiment. In the present embodiment, the case in which the mobile body 30 travels on a route that passes through nodes T, S, R, and Q in turn is described as an example. The control unit 41 translates each link to the left by the offset, except for the bottleneck link connecting node S and node R4, to generate the second route 62.

Since the bottleneck link is connected to an intersection link, the control unit 41 needs to acquire the transit passes for these links before passing through node S and return the transit passes in sequence after passing through the links. The timing for acquiring the transit passes is described with reference to FIG. 33.

In FIG. 33, the position along the second route 62 that is the request distance away from node S in the opposite direction from the direction of travel of the mobile body 30 is indicated by point Srq. Similarly, the position along the second route 62 that is the confirmation distance away from node S is indicated by point Sck. The control unit 41 determines the current position of the mobile body 30 when necessary based on information such as information acquired from the sensor 34. In a case in which the mobile body 30 reaches point Srq, the control unit 41 transmits an issuance request to the server 20 for transit passes related to travel after point Sck.

In a case in which the mobile body 30 has not received a transit pass before reaching point Sck, the control unit 41 does not indicate the route to be traveled after point Sck to the drive apparatus 36. The drive apparatus 36 stops the mobile body 30 at point Sck. The mobile body 30 remains stopped and waits until the transit passes are issued.

In a case in which the mobile body 30 has traveled the request distance along the second route 62 from node R4 after passing through the bottleneck link between node S and node R4, the control unit 41 returns the transit pass required to travel the bottleneck link to the server 20. Similarly, in a case in which the mobile body 30 has traveled the request distance along the second route 62 after passing through the intersection at node R4, the control unit 41 returns the transit pass required to travel the intersection link to the server 20.

According to the present embodiment, it is possible to provide an information processing system 10 that requires less computation when calculating the position for requesting issuance of a transit pass and the position for confirming the transit pass, as compared to the first embodiment, which calculates the respective intersections of the transit pass request line 65 and the transit pass confirmation line 66 with the second route 62. Since less computation is required of the control unit 41, the control apparatus 40 can be realized with inexpensive, low power consumption hardware.

In a case in which the mobile body 30 is used in a building with multiple floors, information identifying the floor can be provided to the nodes as described in the second embodiment. As described in FIG. 22, by defining the transit pass request lines 65 and the transit pass confirmation lines 66 for each floor and managing the transit passes, the routes traveled by mobile bodies 30 traveling on different floors can be prevented from affecting by each other.

However, in the case of a large number of floors and of mobile bodies 30, the load on the server 20 can be reduced by managing multiple floors as if they were a single plane, ignoring the height information. In this case, the links traveled before and after the mobile body 30 moves across the floor may intersect each other on the plane. Therefore, when using the transit pass request line 65 and the transit pass confirmation line 66 to manage the issuance and return of transit passes, it may not be possible to manage the transit passes properly.

Furthermore, in a case in which links requiring a transit pass are located on multiple floors and intersect each other on the plane, the determination to issue a transit pass to a mobile body 30 traveling on one floor might not be properly made due to the effect of the status of issuance of the transit pass to a mobile body 30 traveling on a different floor.

A concrete example is given below. Let one of the two floors be the first floor and the other the second floor. A first link located on the first floor and a second link located on the second floor intersect on the plane, and both require a transit pass.

In the example described below, the control unit 21 has issued a transit pass for the first link based on a request from the first mobile body 30 traveling on the first floor, and the second mobile body 30 traveling on the second floor requests a transit pass for the second link from the control unit 21. Since the first link and the second link intersect on the plane, the control unit 21 may erroneously determine that the travel route of the second mobile body 30 interferes with the travel route of the first mobile body 30 and that a transit pass regarding the second link cannot be issued.

In the case of such an erroneous determination, the second mobile is forced to wait without a transit pass until the transit pass for the first link is returned from the first mobile body 30, even though there is no actual possibility of contact or collision between the first mobile body 30 and the second mobile body 30.

According to the present embodiment, by managing multiple floors as if they were a single plane, it is possible to provide an information processing system 10 that properly manages the transit passes to enable smooth operation of the mobile bodies 30 while reducing the load on the server 20.

According to the present embodiment, it is possible to provide an information processing system 10 that can properly request and confirm the issuance of transit passes in an area containing a three-dimensional intersection through which a mobile body 30 can pass, for example. According to the present embodiment, it is possible to provide an information processing system 10 that can appropriately control a mobile body 30 that can travel over multiple floors in coordination with the elevator 17, for example.

Sixth Embodiment

The present embodiment relates to a mobile body 30 equipped with a so-called pickup function, in which the mobile body 30 picks up the user. A description of parts in common with the first embodiment is omitted.

Figure 34:
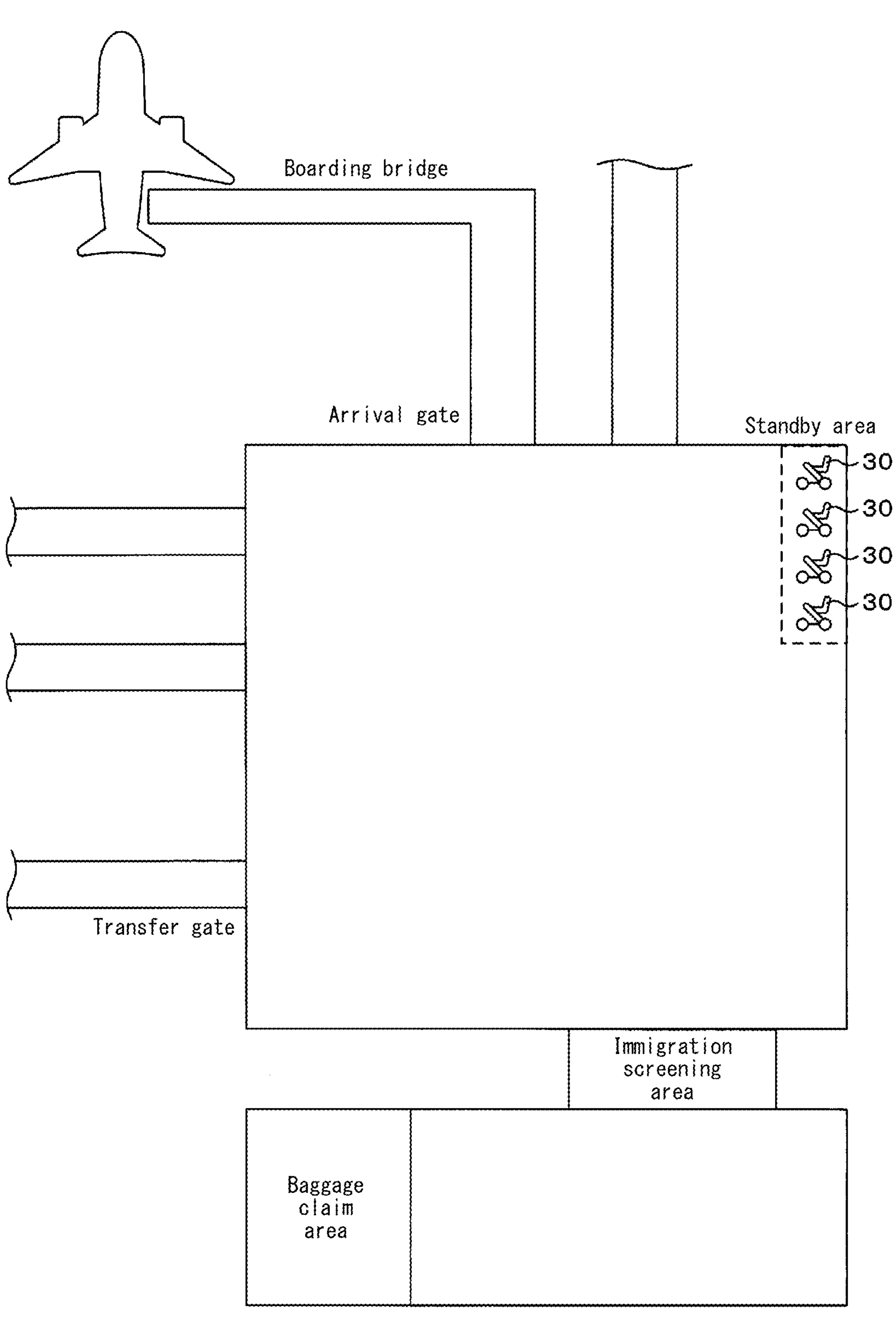
FIG. 34 is a diagram illustrating an example of a location where the mobile body of a sixth embodiment is traveling.

FIG. 34 is a diagram illustrating an example of a location where the mobile body 30 of the sixth embodiment is traveling. In the following, an information processing system 10 used at an international airport is described as an example. Passengers disembarking from an airplane first pass through the boarding bridge and arrival gate, then undergo immigration screening and stop at the baggage claim area after entering the country. Some passengers do not go through immigration screening but rather proceed to a transfer gate. The airport has a standby area where mobile bodies 30 for pickup are on standby.

In the present embodiment, for example, a ground attendant at the airport checks the passenger list to confirm whether there are any passengers who will use the mobile body 30. In a case in which there is a passenger who uses the mobile body 30, the ground attendant uses a mobile terminal or the like to request a mobile body 30 for pickup. The server 20 receives the notification from the mobile terminal and selects a mobile body 30 on standby. The server 20 directs the mobile body 30 to the arrival gate.

The attendant may request that another staff member call the mobile body 30 for pickup via an intercom or the like. An airline company server may transmit a request to the server 20 to direct the mobile body 30 for pickup to the arrival gate based on a flag in the passenger list.

The mobile body 30 automatically travels to a point near the connection between the boarding bridge and the airplane or to the arrival gate. The mobile body 30 preferably travels while displaying a notice such as "pickup". The ground attendant confirms the user's name and the like and assists in boarding the mobile body 30. After the user boards, the mobile body 30 travels to the destination in the same manner as in the first embodiment.

The server 20 may, for example, acquire information about the airline ticket held by the user and automatically set the destination. Specifically, in a case in which the user arrives at the airport, which is the final destination, the server 20 sets the destination of the mobile body 30 so as to head to the airport exit via the immigration screening area and the baggage claim area. In a case in which the user is in transit, the server 20 sets the destination of the mobile body 30 so as to head to the transfer gate, transfer lounge, or the like.

Figure 35:
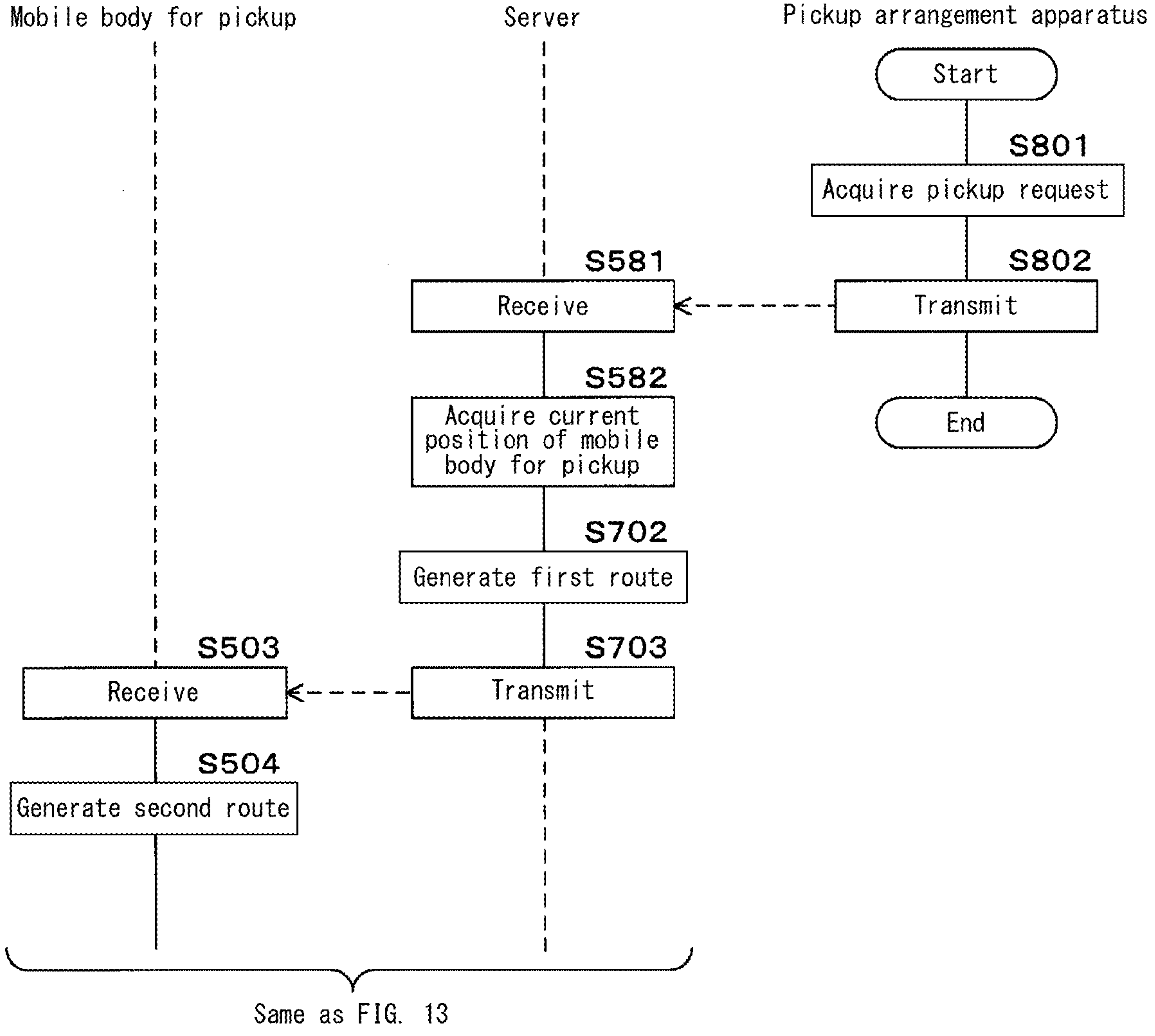
FIG. 35 is a flowchart illustrating the flow of processing by a program in the sixth embodiment.

FIG. 35 is a flowchart illustrating the flow of processing in a program of the sixth embodiment. In FIG. 35, a pickup arrangement apparatus is a terminal apparatus used by ground attendants or is an airline company server or the like. The pickup arrangement apparatus acquires a pickup request (step S801).

The pickup request includes pickup information such as pickup positional information on an arrival gate number entered by the ground attendant, an estimated arrival time, and a mobile body ID that identifies the mobile body 30 to be used for the pickup. The pickup positional information and estimated arrival time may be the arrival gate number and estimated arrival time acquired from a control information system. The pickup arrangement apparatus transmits the pickup information to the server 20 (step S802). The mobile body 30 used for pickup may be described below as a pickup vehicle. The ground attendant operates the pickup arrangement apparatus and designates the mobile body ID of the pickup vehicle.

The control unit 21 receives the pickup information (step S581). The control unit 21 acquires the current position of the pickup vehicle designated by the ground attendant (step S582). Instead of accepting the designation of the pickup vehicle by the ground attendant, the control unit 21 may determine the mobile body 30 that is on standby at the standby area closest to the arrival gate to be the pickup vehicle and may acquire the positional information. If there is no mobile body 30 on standby, the control unit 21 may determine the mobile body 30 on standby at the next nearest standby area or the like to be the mobile body 30 to respond to the pickup request and may acquire the positional information.

The control unit 21 generates a first route 61 for the mobile body 30 to travel to the pickup position based on the current position of the mobile body 30 for pickup and the pickup position (step S702). The control unit 21 transmits information about the first route 61 to the mobile body 30 for pickup (step S703).

The control unit 41 of the mobile body 30 receives information about the first route 61 (step S503). The control unit 41 generates the second route 62 (step S504). The processing performed by the control unit 21 from step S703 onward and the processing performed by the control unit 41 from step S504 onward are the same as in the program of the first embodiment described with reference to FIG. 13. A description is therefore omitted.

The processing after the user has boarded the mobile body 30 is the same as the processing when executing the program from the beginning as described with reference to FIG. 13. A description is therefore omitted.

According to the present embodiment, it is possible to provide an information processing system 10 with a pickup function for the mobile body 30 to pick up a user. Arrival gates, for example, are not always used, but rather are used when a plane arrives. Therefore, by moving the required number of mobile bodies 30 to the arrival gate in accordance with the arrival of an airplane, it is possible to provide an information processing system 10 that can utilize the mobile bodies 30 efficiently.

Seventh Embodiment

Figure 36:
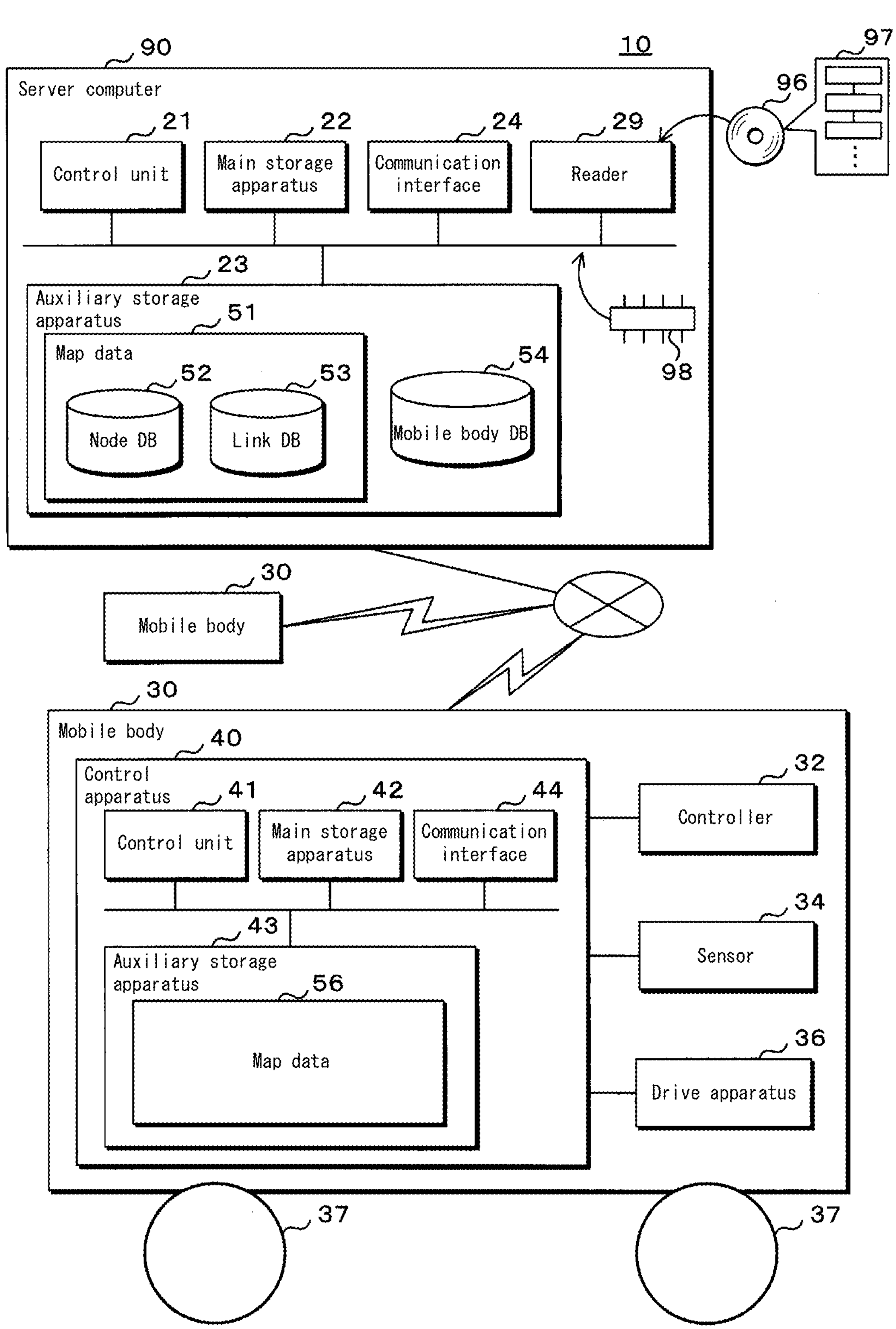
FIG. 36 is a diagram illustrating the configuration of an information processing system in a seventh embodiment.

FIG. 36 is a diagram illustrating the configuration of an information processing system 10 in a seventh embodiment. The present embodiment relates to an embodiment for realizing the information processing system 10 by operating a combination of a general-purpose server computer 90 and a program 97. A description of parts in common with the first embodiment is omitted.

The server computer 90 includes a reader 29 in addition to the above-described control unit 21, main storage apparatus 22, auxiliary storage apparatus 23, communication interface 24, and bus.

The program 97 is recorded on a portable recording medium 96. The control unit 21 reads the program 97 via the reader 29 and stores the program 97 in the auxiliary storage apparatus 23. The control unit 21 may also read the program 97 stored in a semiconductor memory 98 such as a flash memory mounted in the server computer 90. Furthermore, the control unit 21 may download the program 97 from another, non-illustrated server computer connected via the communication interface 24 and a non-illustrated network and store the program 97 in the auxiliary storage apparatus 23.

The program 97 is installed as a control program of the server computer 90, loaded into the main storage apparatus 22, and executed. The control unit 21 transmits the portion of the program 97 that is executed by the control unit 41 to the respective control apparatuses 40 via the network. The transmitted program is installed as a control program of the control apparatus 40, loaded into the main storage apparatus 42, and executed.

With this configuration, the information processing system 10 described in the first embodiment is realized. The program 97 in the present embodiment is an example of a program product. The computer program can be deployed to run on a single computer, or on a plurality of computers located at a single site or distributed across multiple sites and interconnected by a communication network.

The technical features (constituent elements) described in each example can be combined with each other, and new technical features can be formed by such combinations.

The embodiments disclosed herein are in all respects illustrative and should be considered non-limiting. The scope of the present disclosure is indicated by the claims, not by the above description, and is intended to include all modifications within the meaning and scope of the claims and equivalents thereof.

The independent claims and dependent claims recited among the claims may be combined with each other in any way, regardless of the form of reference. Furthermore, the claims are in a format in which one claim refers to two or more other claims (multiple dependent claim format), but the claims are not limited to this format. The claims may be recited using a format in which a multiple dependent claim refers to at least one other multiple dependent claim (multi-multi claim format).

REFERENCE SIGNS LIST

10 Information processing system
17 Elevator
20 Server (computer)
21 Control unit (second control unit)
22 Main storage apparatus
23 Auxiliary storage apparatus
24 Communication interface
29 Reader
30 Mobile body
32 Controller
34 Sensor
36 Drive apparatus
37 Tire
40 Control apparatus (information processing apparatus, computer, client)
41 Control unit (first control unit)
42 Main storage apparatus
43 Auxiliary storage apparatus
44 Communication interface
51 Map data
52 Node DB
53 Link DB
54 Mobile body DB
56 Map data
61 First route
62 Second route
63 Detour route
65 Transit pass request line
66 Transit pass confirmation line
67 Avoidance boundary line
671 Left side avoidance boundary line
672 Right side avoidance boundary line
68 Partial route
71 Obstacle
711 First obstacle
712 Second obstacle
713 Third obstacle
90 Server computer
96 Portable recording medium
97 Program
98 Semiconductor memory

The invention claimed is:

1. An information processing method for a computer to execute processing comprising:

acquiring a current position and a destination from a mobile body that moves with a person on board;

acquiring a first route from the current position to the destination, the first route being generated based on map data that includes a plurality of nodes, links each connecting a starting node and an ending node, the starting node being one node and the ending node being the other node of two nodes included in the plurality of nodes, and a travel condition associated with each link, the travel condition including information defining how the mobile body is to travel along a corresponding link, the information including information on at least one of: (i) an offset, which is a translation amount from the corresponding link when the mobile body travels along the link from the starting node toward the ending node, and (ii) a relationship between a travel direction of the mobile body and an orientation of the mobile body;

transmitting information on the first route to the mobile body, the information on the first route including a sequence of nodes traversed in order on the first route and the travel condition of each link forming the first route; and causing the mobile body to travel along the first route based on the information on the first route including the travel condition associated with each link while the mobile body detects a traveling position of the mobile body by using a sensor.

2. The information processing method according to claim 1, wherein the processing in a case in which an issuance request for one or more transit passes related to travel on the links is received from the mobile body, determines, for one transit pass for which an issuance request is received or for each of a plurality of transit passes for which an issuance request is received, whether a corresponding transit pass for a second mobile body that interferes with a planned travel route of the mobile body has been issued, determines the transit pass to be issuable in a case in which no corresponding transit pass has been issued, issues a transit pass to the mobile body in a case in which it is determined that all transit passes for which the issuance request has been received are issuable, and accepts return of the transit pass from the mobile body.

3. The information processing method according to claim 2, comprising determining that the second mobile body does not interfere with the planned travel route of the mobile body in a case in which the second mobile body is traveling from a starting node toward an ending node on a same link as a planned travel link of the mobile body.

4. The information processing method according to claim 1, wherein the first route is generated based on the map data that includes a plurality of nodes, links each connecting a starting node and an ending node, the starting node being one node and the ending node being the other node of two nodes included in the plurality of nodes, a travel condition associated with each link, and information indicating whether each link forms an intersection, the processing determines, in a case in which an issuance request for a transit pass related to travel at the intersection is received from the mobile body, whether a corresponding transit pass for a second mobile body that interferes with a planned travel route of the mobile body at the intersection has been issued, the processing issues the transit pass to the mobile body in a case in which it is determined that no corresponding transit pass has been issued, and the processing accepts return of the transit pass from the mobile body.

5. The information processing method according to claim 1, wherein the processing acquires a pickup request including a pickup position where a user is to board, acquires a current position of a mobile body to respond to the pickup request, acquires a first route from the current position to the pickup position, the first route being generated based on the map data, and transmits the first route to the mobile body.

6. The information processing method according to claim 1, wherein the travel condition includes information on whether a transit pass is required when the mobile body travels the link.

7. A non-transitory computer readable medium storing a program configured to cause a computer to execute processing comprising:

acquiring a current position and a destination from a mobile body that moves with a person on board;

acquiring a first route from the current position to the destination, the first route being generated based on map data that includes a plurality of nodes, links each connecting a starting node and an ending node, the starting node being one node and the ending node being the other node of two nodes included in the plurality of nodes, and a travel condition associated with each link, the travel condition including information defining how the mobile body is to travel along a corresponding link, the information including information on at least one of: (i) an offset, which is a translation amount from the corresponding link when the mobile body travels along the link from the starting node toward the ending node, and (ii) a relationship between a travel direction of the mobile body and an orientation of the mobile body;

transmitting information on the first route to the mobile body, the information on the first route including a sequence of nodes traversed in order on the first route and the travel condition of each link forming the first route; and causing the mobile body to travel along the first route based on the information on the first route including the travel condition associated with each link while the mobile body detects a traveling position of the mobile body by using a sensor.

* * * * *